United States Patent
Murayama et al.

(10) Patent No.: US 9,344,645 B2
(45) Date of Patent: May 17, 2016

(54) CAMERA SYSTEM, CAMERA DEVICE, CAMERA CONTROLLER AND RELAY DEVICE

(75) Inventors: Hideaki Murayama, Kanagawa (JP); Satoshi Tsubaki, Kanagawa (JP); Tamotsu Munakata, Kanagawa (JP); Eisaburo Itakura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 344 days.

(21) Appl. No.: 13/070,872

(22) Filed: Mar. 24, 2011

(65) Prior Publication Data
US 2011/0249132 A1    Oct. 13, 2011

(30) Foreign Application Priority Data

Apr. 9, 2010    (JP) ................ P2010-090673
Mar. 10, 2011   (JP) ................ P2011-053192

(51) Int. Cl.
| H04N 5/232 | (2006.01) |
|---|---|
| H04N 5/268 | (2006.01) |
| H04N 5/073 | (2006.01) |

(52) U.S. Cl.
CPC ............. *H04N 5/268* (2013.01); *H04N 5/0733* (2013.01); *H04N 5/232* (2013.01); *H04N 5/23203* (2013.01); *H04N 5/23206* (2013.01)

(58) Field of Classification Search
CPC . H04N 5/0733; H04N 5/232; H05N 5/23203; H05N 5/23206; H05N 5/268
USPC ............... 348/500, 521, 14.01, 143
See application file for complete search history.

(56) References Cited

U.S. PATENT DOCUMENTS

| 5,469,274 A * | 11/1995 | Iwasaki ................. G06T 3/4053 345/648 |
|---|---|---|
| 5,821,995 A * | 10/1998 | Nisikawa ........... H04N 5/23203 348/211.11 |
| 6,438,143 B1 * | 8/2002 | Higashida ........... H04L 49/3081 370/503 |
| 6,912,247 B2 * | 6/2005 | Miyashita ................. H04L 1/24 324/76.14 |
| 6,992,730 B1 * | 1/2006 | Sautter .................... H04N 5/44 348/516 |

(Continued)

FOREIGN PATENT DOCUMENTS

| EP | 1 471 745 | 10/2004 |
|---|---|---|
| EP | 1 478 187 | 11/2004 |

(Continued)

OTHER PUBLICATIONS

Search Report issued in corresponding European application No. 11158961.0 dated Mar. 31, 2014.

(Continued)

*Primary Examiner* — Amy Hsu
(74) *Attorney, Agent, or Firm* — Frommer Lawrence & Haug LLP; William S. Frommer; Ellen Marcie Emas

(57) ABSTRACT

A camera system includes: a camera device which outputs a picked-up image signal in synchronization with an input synchronization signal; a camera controller which is input with the image signal of the camera device; and a relay device which is connected between the camera device and the camera controller and relays the image signal to be transmitted from the camera device to the camera controller, wherein the relay device transmits at least an externally input synchronization signal to the camera device and outputs the image signal to the camera device in synchronization with the externally input synchronization signal.

15 Claims, 23 Drawing Sheets

(56) References Cited

U.S. PATENT DOCUMENTS

| | | | | |
|---|---|---|---|---|
| 7,071,971 | B2* | 7/2006 | Elberbaum | H04N 5/2253 348/143 |
| 7,079,129 | B2* | 7/2006 | Shigeta | H04L 12/40117 345/213 |
| 7,139,014 | B1* | 11/2006 | Kim | H04M 1/72555 348/14.01 |
| 7,151,569 | B2* | 12/2006 | Komori | H04N 5/3595 348/312 |
| 7,456,863 | B2* | 11/2008 | Nakajima | H04N 5/23203 348/211.14 |
| 7,683,972 | B2* | 3/2010 | Tanigawa | G09G 5/008 348/497 |
| 7,821,550 | B2* | 10/2010 | Yamashina | H04N 7/181 348/143 |
| 8,289,445 | B2* | 10/2012 | Yamashita | H04N 7/015 348/423.1 |
| 8,368,767 | B2* | 2/2013 | Ogasawara | H04N 5/23203 348/207.99 |
| 2002/0149672 | A1* | 10/2002 | Clapp | H04N 7/15 348/14.09 |
| 2003/0112338 | A1 | 6/2003 | Pelletier et al. | |
| 2004/0257469 | A1* | 12/2004 | Compton | H04N 21/4305 348/500 |
| 2009/0175271 | A1* | 7/2009 | Tapie | H04N 21/242 370/389 |
| 2010/0183000 | A1* | 7/2010 | Nakayama | H04N 21/2365 370/352 |

FOREIGN PATENT DOCUMENTS

| | | | | |
|---|---|---|---|---|
| GB | 2 385 684 | | 8/2003 | |
| JP | 9-507628 | | 7/1997 | |
| JP | 2000-244914 | | 9/2000 | |
| JP | 2004-088594 | | 3/2004 | |
| JP | 2004088594 | * | 3/2004 | H04N 5/222 |
| JP | 2004 304809 | | 10/2004 | |
| JP | 2005 57499 | | 3/2005 | |
| JP | 2005 64816 | | 3/2005 | |
| JP | 2005-203876 | | 7/2005 | |
| JP | 2007-295538 | | 11/2007 | |
| JP | 2008-079142 | | 4/2008 | |
| JP | 2009-253987 | | 10/2009 | |
| JP | 2009253987 | * | 10/2009 | H04N 5/232 |
| WO | WO 2008/113791 | | 9/2008 | |

OTHER PUBLICATIONS

Office Action issued in corresponding Japanese application No. 2011-053192 dated Dec. 2, 2014.

Office Action issued in corresponding Japanese application No. 2011-053192 dated Jun. 23, 2015.

* cited by examiner

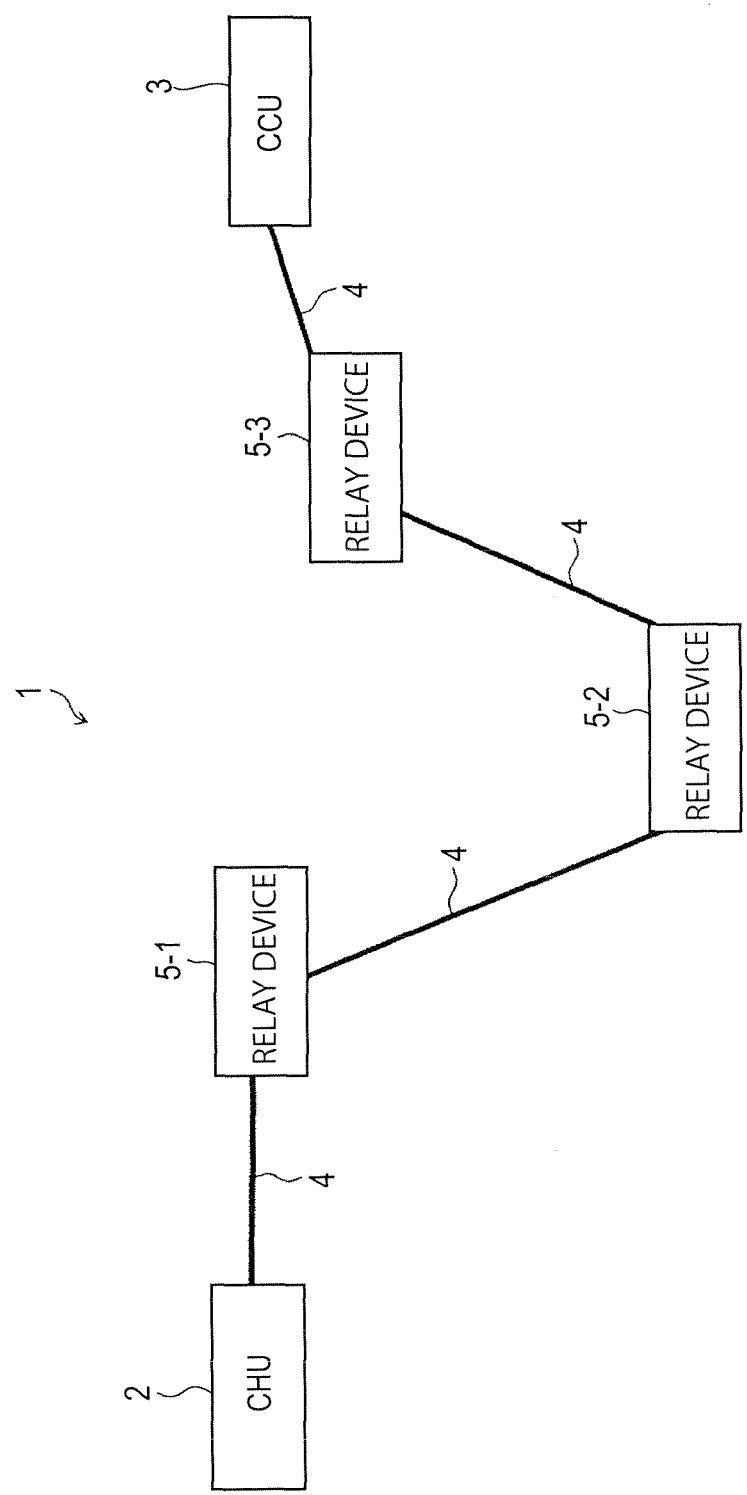

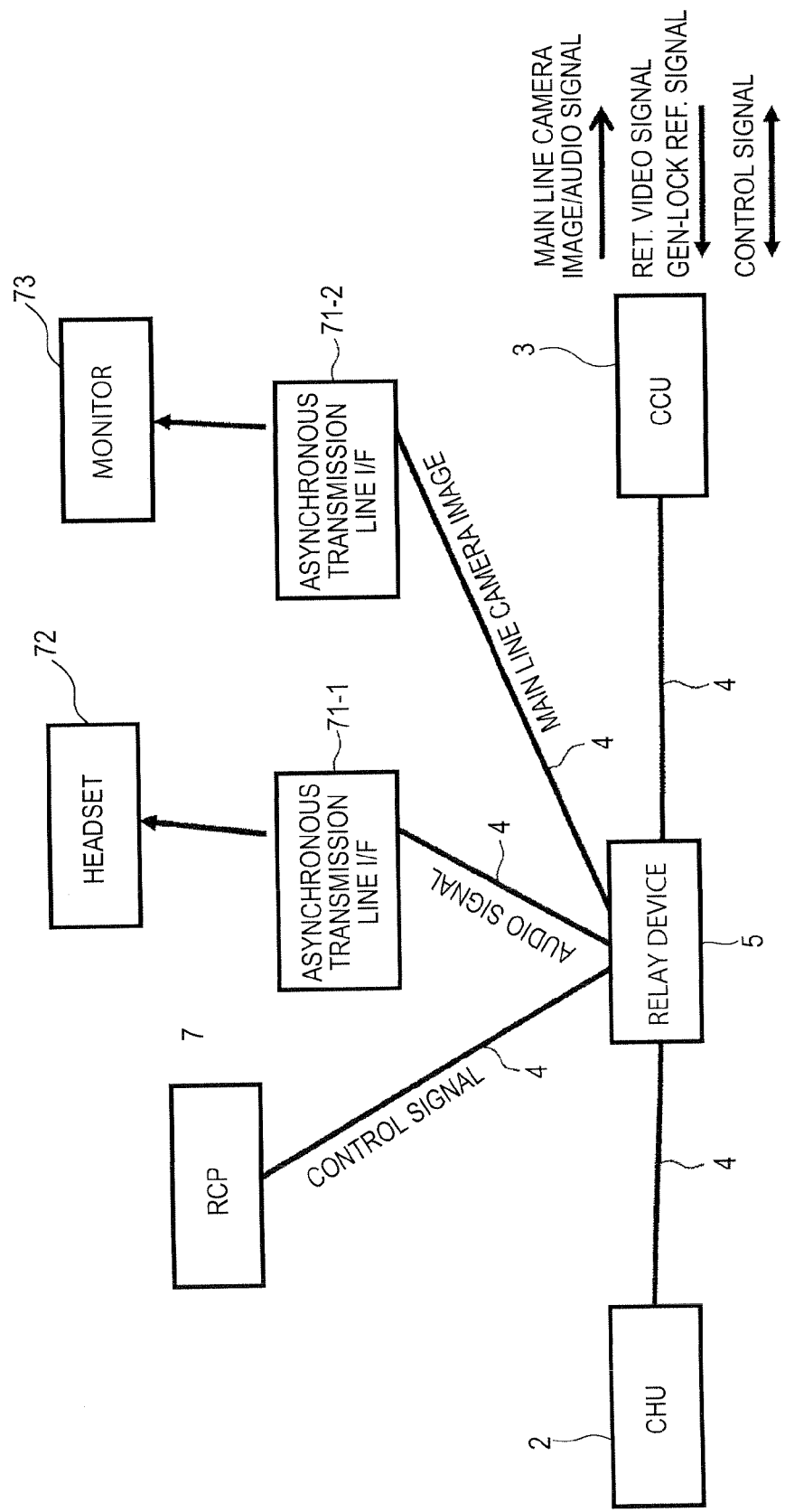

EXAMPLE OF FREQUENCY ARRANGEMENT OF MAIN LINE SIGNAL AND RETURN VIDEO

CAMERA SYSTEM, CAMERA DEVICE, CAMERA CONTROLLER AND RELAY DEVICE

BACKGROUND OF THE INVENTION

1. Field of the Invention

The present invention relates to a camera system which outputs a picked-up image signal, a camera device, a camera controller and a relay device.

2. Description of the Related Art

In a camera system used in a broadcasting station and so on, a camera head unit (CHU) which outputs an image signal and a camera control unit (CCU) which is input with an image signal are connected by a triax cable or an optical fiber cable (see JP-A-2005-057499 and JP-A-2005-064816).

SUMMARY OF THE INVENTION

However, when the CHU and the CCU are connected in a one-to-one correspondence by a triax cable or an optical fiber cable, an image signal picked up by the CHU needs to be taken from the CCU. In addition, there is a need to input a GEN-LOCK signal, a control signal, a return image signal and so on for the CHU from the CCU.

As a result, in the camera system used in the broadcasting station and so on, a plurality of cables may be connected to the CCU and it may take time to connect or install the cables.

In addition, when one camera system is established and then the CHU and so on are added, replaced or newly equipped, it takes a lot of time and trouble to change the cable connection of the CCU.

Thus, there is a need for such a camera system to reduce the number of cable connections of the CCU and facilitate system change or the like.

According to an embodiment of the present invention, there is provided a camera system including: a camera device which outputs a picked-up image signal in synchronization with an input synchronization signal; a camera controller which is input with the image signal of the camera device; and a relay device which is connected between the camera device and the camera controller and relays the image signal to be transmitted from the camera device to the camera controller. The relay device transmits at least an externally input synchronization signal to the camera device and outputs the image signal to the camera device in synchronization with the externally input synchronization signal.

In the camera system according to the embodiment, the relay device is connected between the camera device and the camera controller and the synchronization signal may be input from the outside to the relay device. Accordingly, there is no necessity to input the synchronization signal from the camera controller and it is possible to reduce the number of cables to be connected to the camera device.

According to another embodiment of the present invention, there is provided a camera device including: an image camera pickup section which generates a picked-up video signal; and a communication section which receives the video signal and transmits an image signal including the video signal. The communication section receives a packetized synchronization signal and transmits a packetized image signal in synchronization with receipt of the packetized synchronization signal.

According to still another embodiment of the present invention, there is provided a camera controller including: a communication section which transmits and receives a picked-up image signal and a synchronization signal; and a signal processor which processes the image signal and the synchronization signal which are transmitted and received by the communication section. The communication section packetizes and transmits the synchronization signal and receives the image signal transmitted in synchronization with the packetized synchronization signal.

According to yet another embodiment of the present invention, there is provided a relay device including: a first connector which is adapted to receive a picked-up image signal from a camera device; a second connector which is adapted to receive a synchronization signal synchronizing the image signal from a camera controller; a third connector which communicates with an external device; and a communication controller. The communication controller transmits the synchronization signal, which is input from the second connector or the third connector, from the first connector to the camera device.

According to the above embodiments, the number of cables to be connected to the CCU can be reduced and the camera system can be easily modified.

BRIEF DESCRIPTION OF THE DRAWINGS

FIG. 9 is a schematic view showing a configuration of a camera system according to a second embodiment of the present invention.

FIG. 10 is a schematic view showing a configuration of a camera system according to a third embodiment of the present invention.

DESCRIPTION OF THE PREFERRED EMBODIMENTS

Hereinafter, embodiments of the present invention will be described with reference to the drawings.

Description will be given in the following order.
1. First embodiment (example of a general camera system)
2. Second embodiment (example of a camera system with relays connected in series)
3. Third embodiment (example of a modified camera system)
4. Fourth embodiment (example of a modified camera system)
5. First comparative example (example of an optical fiber cable
6. Second comparative example (example of a triax cable)

1. First Embodiment

[Camera System 1]

Figure 1:
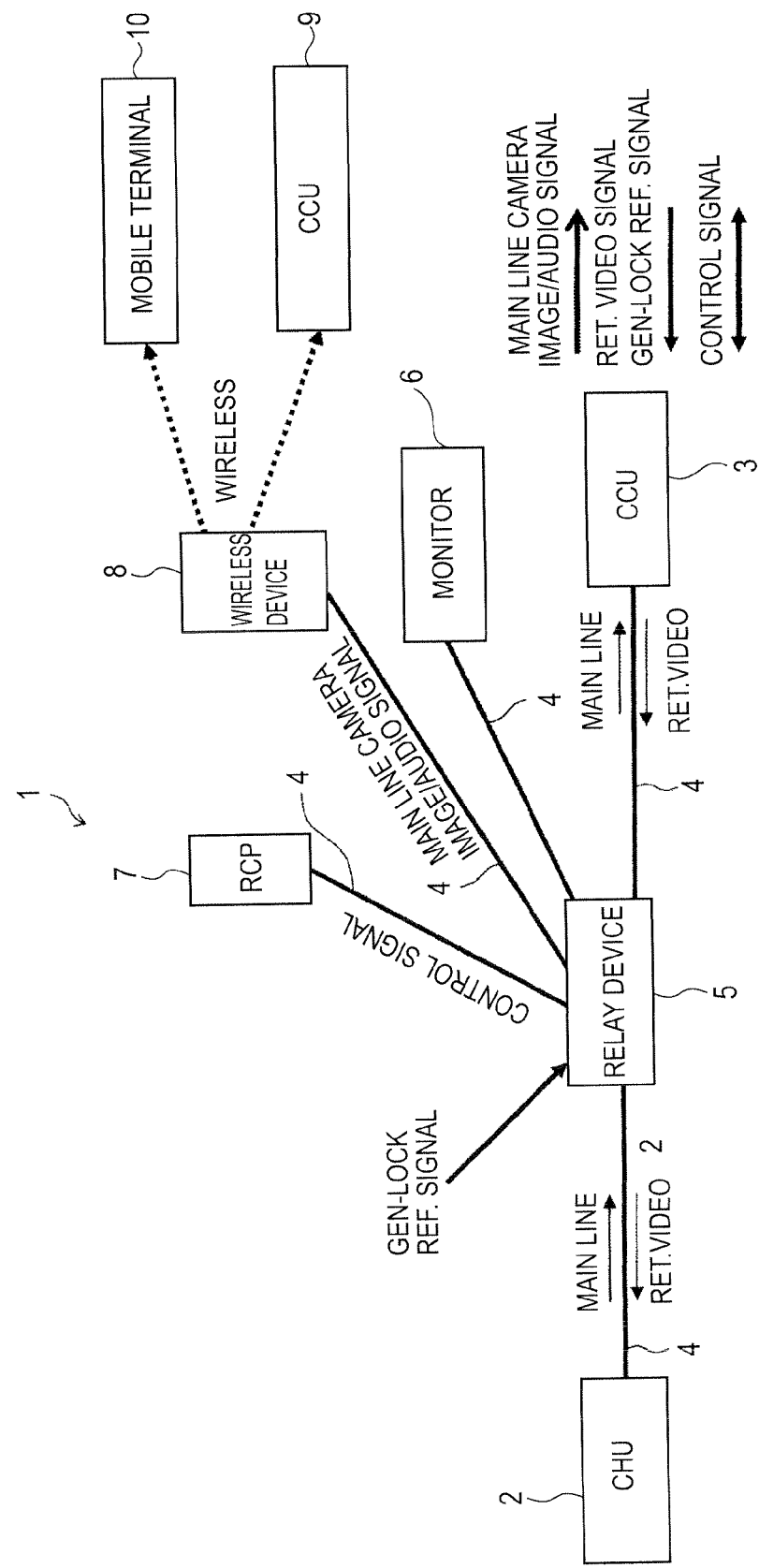
FIG. 1 is a schematic view showing a configuration of a camera system according to a first embodiment of the present invention.

FIG. 1 is a schematic view showing a configuration of a camera system 1 according to a first embodiment of the present invention.

The camera system 1 of FIG. 1 is used for a broadcasting station and so on and includes a camera head unit (CHU) 2 and a camera control unit (CCU) 3.

The CHU 2 and the CCU 3 are connected to a relay device 5 via a twisted-pair cable 4.

It is sufficient if the twisted-pair cable 4 complies with IEEE (The Institute of Electrical and Electronics Engineers, Inc.) 802.3 or the like.

The relay device 5 is, for example, a switching hub of Five ports 51.

The switching hub selects a port 51 of an output destination based on a destination of packets input from each port 51 and outputs the packets from the port 51.

In addition, if a broadcast address is used for the packets, the switching hub basically outputs the received packets from all ports 51.

The relay device 5 is connected with a monitor 6, a remote control panel (RCP) 7 which generates a control signal, a wireless device 8 and so on in addition to the CHU 2 and the CCU 3.

The wireless device 8 is able to conduct wireless communication with other CCU 9, a mobile terminal 10 and so on.

In addition, the relay device 5 may be connected with a signal generator (SG) which generates a GEN-LOCK signal (reference signal), a measuring instrument and so on by a wired/wireless communication line.

IEEE 802.3 is a kind of standard of data communication systems using packets and packetizes and communicates communication data by a predetermined amount of data.

To this end, in the camera system 1 of FIG. 1, the CHU 2 and the CCU 3 packetize a video signal, an audio signal, a control signal, a GEN-LOCK signal and so on and transmit the packetized signals via an asynchronous transmission line.

In addition, in the camera system 1 of FIG. 1, a video signal including a picked-up main line video signal, an audio signal, a control signal, a GEN-LOCK signal and so on may be taken from or inserted in the relay device 5 placed between the CHU 2 and the CCU 3.

For example, another CCU 9 outputs a GEN-LOCK signal to the relay device 5. The relay device 5 transmits the externally input GEN-LOCK signal to the CHU 2 and the CCU 3. The CHU 2 generates and outputs a video signal in synchronization with the external GEN-LOCK signal.

In addition, for example, the RCP 7 outputs a control signal to the relay device 5. The relay device 5 transmits the externally input control signal to the CHU 2 and the CCU 3.

In addition, the relay device 5 outputs a video signal transmitted by the CHU 2 and a return video signal transmitted by the CCU 3 to the outside. These images may be confirmed with, for example, the monitor 6, the mobile terminal 10 and so on.

In this manner, in the camera system 1 of FIG. 1, an image relay system using the CHU 2 may be simply configured, installed and operated at a low cost.

[CHU 2]

Figure 2:
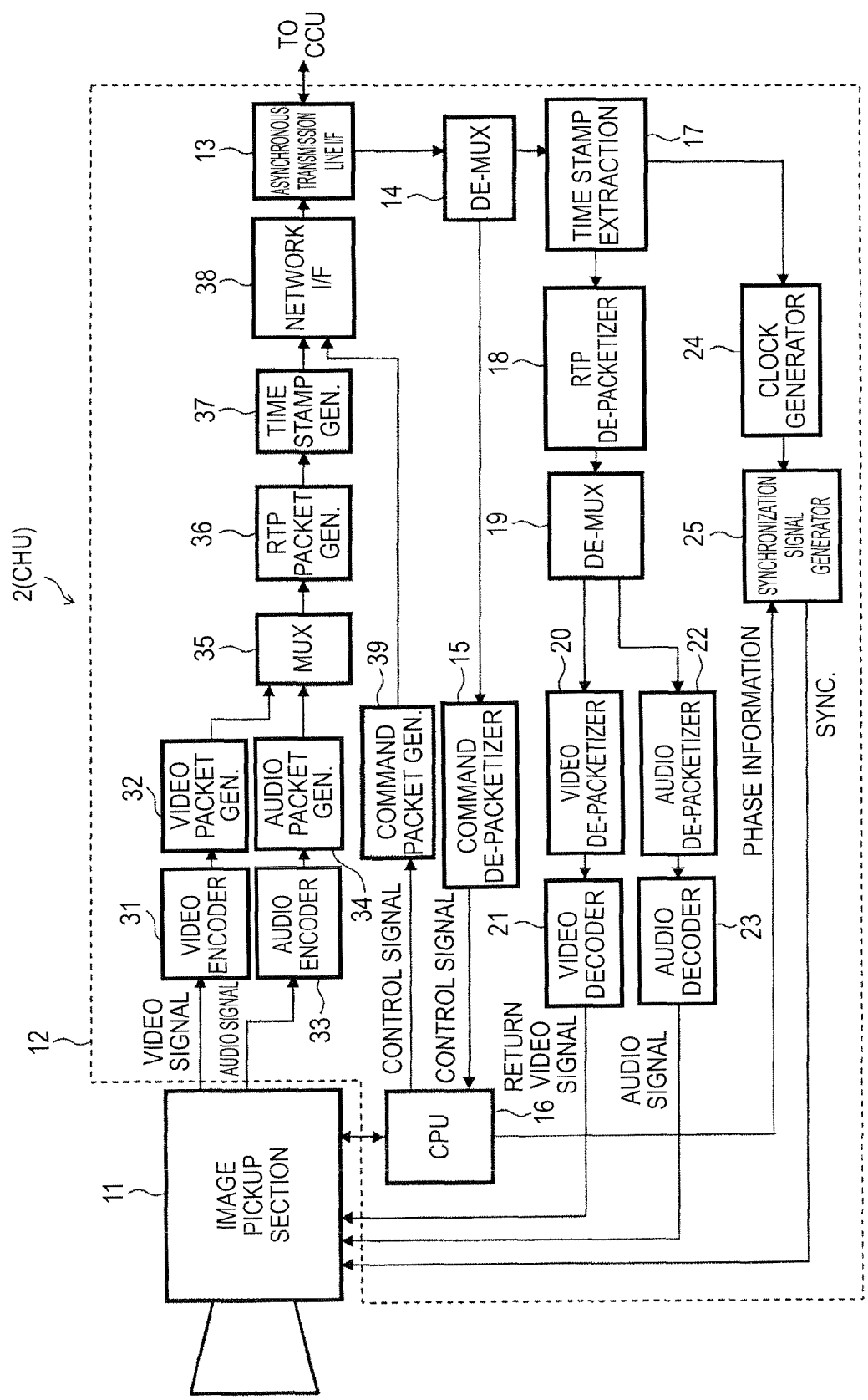
FIG. 2 is a schematic block diagram of a CHU in FIG. 1.

FIG. 2 is a schematic block diagram of the CHU 2 in FIG. 1.

The CHU 2 of FIG. 2 includes an image pickup section 11 which generates a picked-up main video signal and an audio signal and a CHU communication section 12 to which the twisted-pair cable 4 is connected.

The CHU communication section 12 transmits and receives a packetized video signal and so on asynchronously.

The CHU communication section 12 includes an interface 13 to which the twisted-pair cable 4 complying with IEEE 802.3 is connected.

For example, the CHU communication section 12 transmits a packet of video signal and receives a packet of GEN-LOCK signal by means of asynchronous two-way communication using the twisted-pair cable 4.

The interface 13 receives packets of a return video signal, audio signal, control signal, GEN-LOCK signal and so on from the twisted-pair cable 4 in asynchronous transmission mode.

In addition, a demultiplexer 14 separates data of the control signal from the packets received by the interface 13 and a command depacketizer 15 converts the data into the control signal.

The control signal is analyzed by a central processing unit (CPU) 16 and is used for, for example, an iris control of the image pickup section 11.

In addition, the packets of the return video signal and audio signal received by the interface 13 are separated by the demultiplexer 14 and time information is extracted from the packets by a time stamp extractor 17. In addition, the packets are separated into a packet of the return video signal and a packet of the audio signal by an RTP depacketizer 18 and a demultiplexer 19.

A time stamp is used to generate a clock or a synchronization signal in the CHU 2.

The separated packet of the return video signal is converted into a return video signal by a video depacketizer 20 and a video decoder 21.

In addition, the separated packet of the audio signal is converted into an audio signal by an audio depacketizer 22 and an audio decoder 23.

The return video signal and the audio signal are output to the image pickup section 11. The image pickup section 11 outputs an image and sound from a monitor (not shown) or a headset 72.

In addition, the packetized GEN-LOCK signal received by the interface 13 is separated as packet data by the demultiplexer 14 for packet separation. In addition, time information is extracted by the time stamp extractor 17 and is input to a clock generator 24.

The clock generator 24 generates a clock signal having a predetermined frequency from the GEN-LOCK signal.

Based on phase information from a CPU 16, a synchronization signal generator 25 generates an internal clock signal and a synchronization signal synchronizing with the clock signal generated from the GEN-LOCK signal in terms of period and phase and outputs the generated internal clock signal and synchronization signal to the image pickup section 11.

Accordingly, an image pickup timing and so on of each image frame in the image pickup section 11 synchronize with the GEN-LOCK signal.

The image pickup section 11 outputs a picked-up video signal and an audio signal to the CHU communication section 12, for example, at a timing synchronizing with the GEN-LOCK signal.

The video signal output from the image pickup section 11 is compressed by a video encoder 31. For example, for a video codec of a system used as a live camera, the video encoder 31 uses a line base codec having a low delay.

A video packet generator 32 adds a image header to the compressed video signal and packetizes the video signal with the image header added thereto.

The audio signal output from the image pickup section 11 is compressed by an audio encoder 33 and is added and packetized with an audio header by an audio packet generator 34.

The packetized video data and audio data are multiplexed by a multiplexer 35. In addition, an RTP header is added by an RTP packet generator 36 and a time stamp and an IP header are added by a time stamp generator 37 and a network interface 38. The interface 13 transmits this packet to a communication cable in an asynchronous transmission mode.

In addition, a command packetizer 39 packetizes the control signal input from the CPU.

Figure 3:
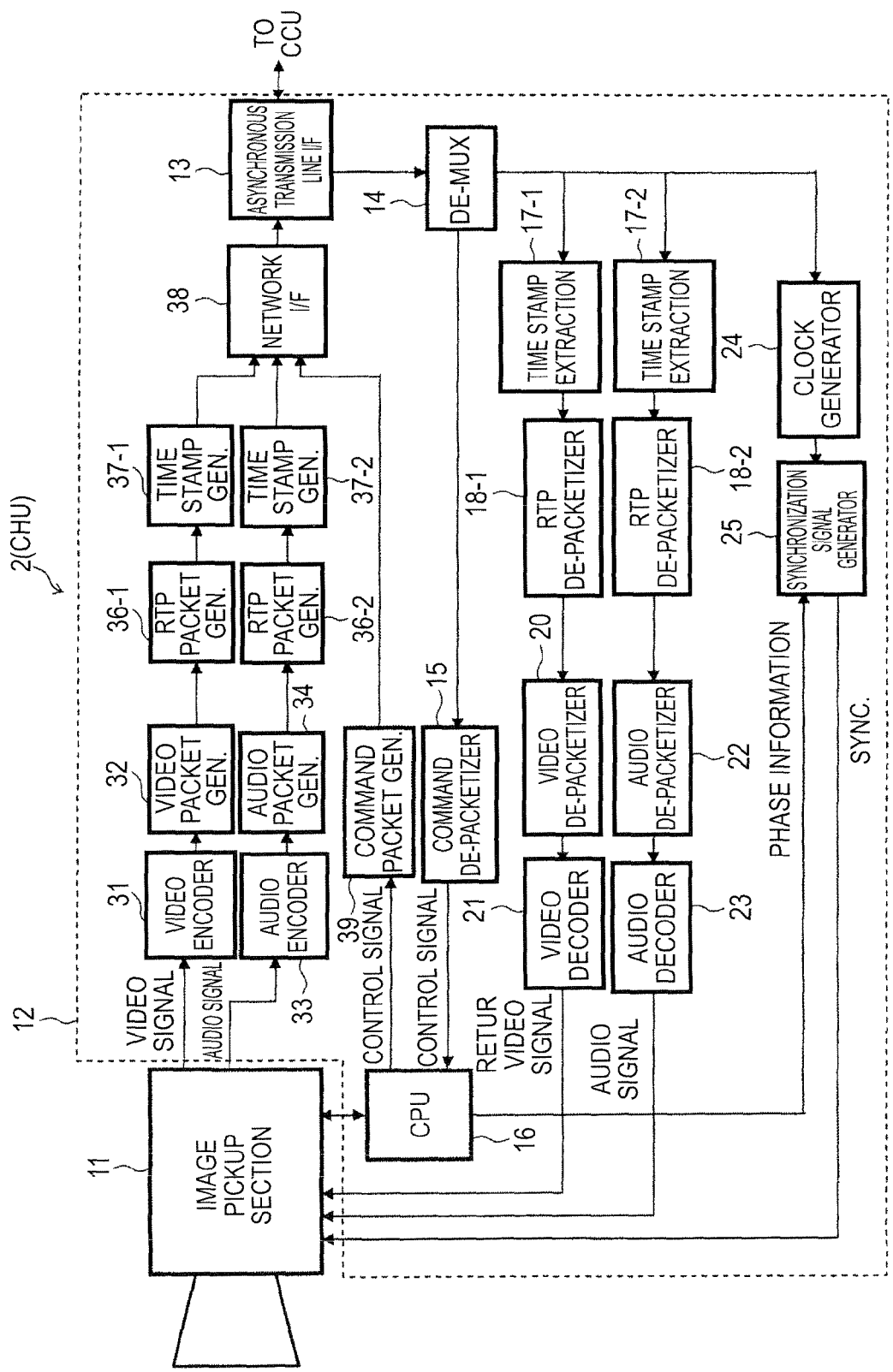
FIG. 3 is a schematic block diagram of a modification of a CHU in FIG. 2.

FIG. 3 is a schematic block diagram of a modification of the CHU 2 in FIG. 2.

In the CHU 2 of FIG. 3, an image packet with an added image header and an audio packet with an added audio header are independently RTP-packetized and are then transmitted, as independent IP packets, from the CCU 3.

To this end, in the CHU 2 of FIG. 3, a return video data packet, an audio data packet and a command data packet transmitted from the CCU 3 are separated by the demultiplexer 14.

In addition, time stamps are extracted from the video packet and the audio packet by respective time stamp extractors 17-1 and 17-2 and headers are removed by respective RTP depacketizers 18-1 and 18-2.

In addition, the video packet is returned to a return video signal by the video depacketizer 20 and the video decoder 21.

In addition, the audio packet is returned to an audio signal by the audio depacketizer 22 and the audio decoder 23.

The return video signal and the audio signal are output to the image pickup section 11. The time stamps are used to generate clocks or synchronization signals in the CHU 2.

In addition, in the CHU 2 of FIG. 3, the image packet with the added image header and the voice packet with the added voice header are RTP-packetized by respective RTP packetizers 36-1 and 36-2. Thereafter, time stamps are added by respective time stamp generators 37-1 and 37-2 and then are transmitted, as independent IP packets, to the CCU 3.

In addition, if a frequency band of an asynchronous transmission line band is sufficiently wider than a frequency band of a signal propagating on this line, the signal may be IP-packetized without being compressed with no necessity of the video encoder 31 and the audio encoder 33. In this case, the video decoder 21 and the audio decoder 23 are also unnecessary.

[CCU 3]

Figure 4:
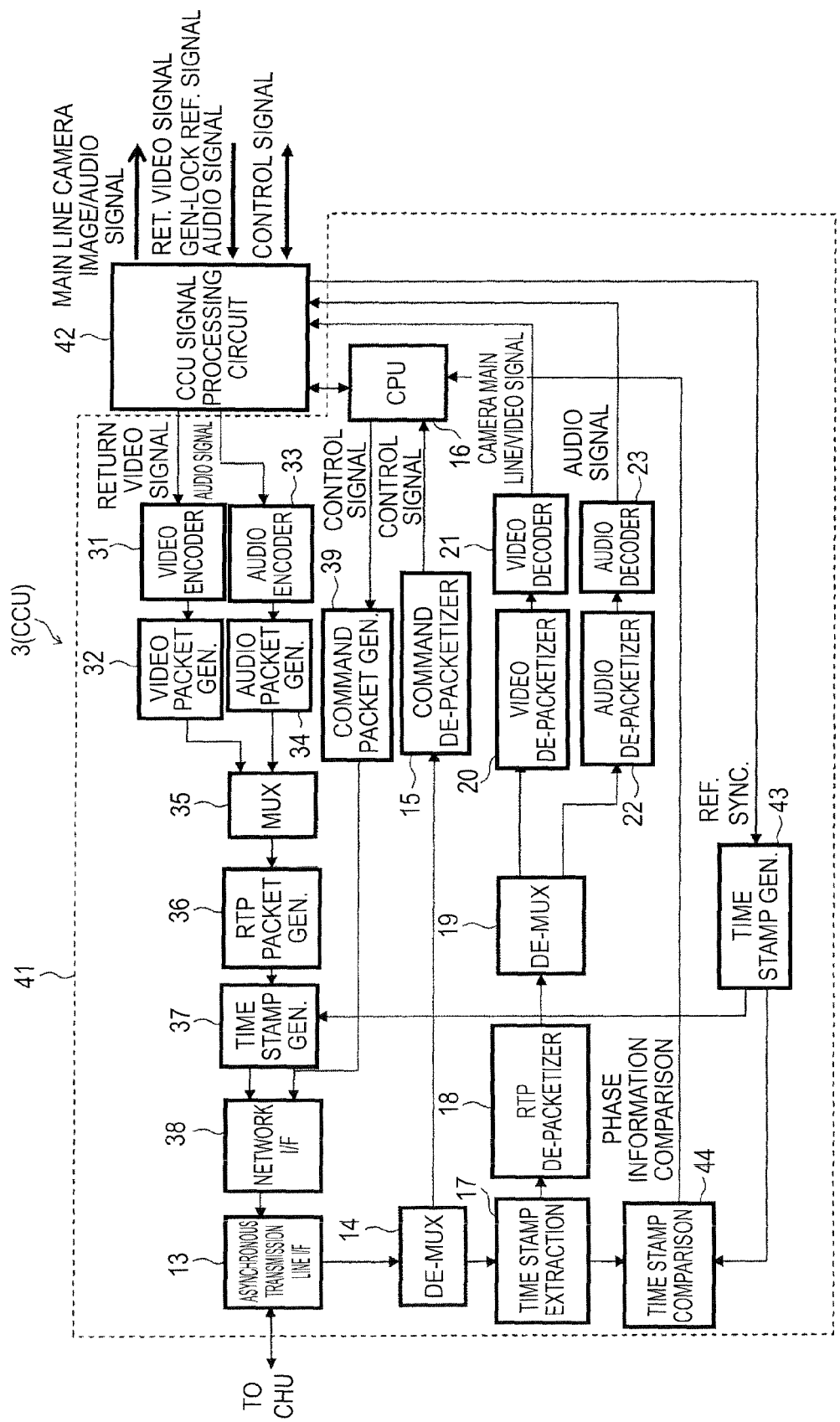
FIG. 4 is a schematic block diagram of the CCU in FIG. 1.

FIG. 4 is a schematic block diagram of the CCU 3 in FIG. 1.

The CCU 3 of FIG. 4 includes a CCU communication section which transmits and receives a video signal, a synchronization signal and so on between the CCU 3 and the CHU 2 and a signal processing section 42 which processes the video signal, the synchronization signal and so on transmitted and received by the CCU communication section 41.

The CHU communication section 12 transmits and receives the packetized return video signal, GEN-LOCK signal and so on asynchronously.

The CHU communication section 12 includes the interface 13 to which the twisted-pair cable 4 is connected. For example, the CHU communication section 12 transmits a packet of video signal and receives a packet of GEN-LOCK signal by means of asynchronous two-way communication using the twisted-pair cable 4.

The CCU communication section 41 includes a time stamp generator 43 and a time stamp comparator 44.

The CCU communication section 41 includes elements having the same functions as those of the CHU 2 of FIG. 2 and therefore, they are denoted by the same reference numerals and explanation thereof will not be repeated.

In this manner, as the CHU 2 and the CCU 3 include the communication sections 12 and 41 having the same structure, the CHU 2 and the CCU 3 may transmit and receive communication data bidirectionally.

The time stamp generator 43 generates a time stamp based on a synchronization signal input from the signal processing section 42.

The time stamp comparator 44 compares a time stamp extracted by the time stamp extractor 17 with a time stamp generated by the time stamp generator 43 and outputs a result of comparison to CPU 16.

[Transmission Signal and Transmission Scheme]

Figure 5:
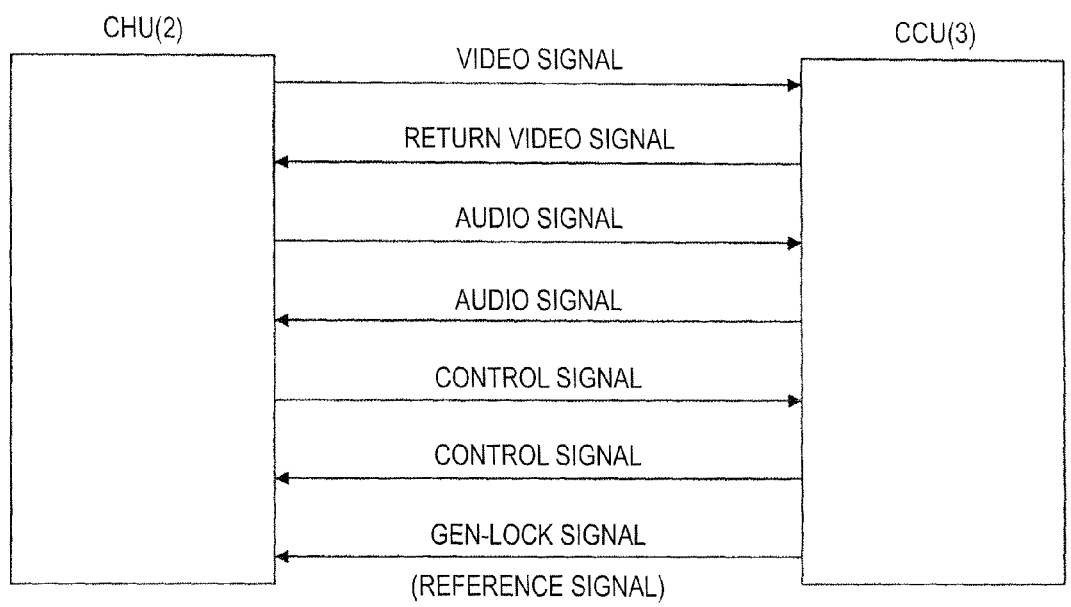
FIG. 5 is an explanatory view of various signals transmitted between the CHU and the CCU in FIG. 1.

FIG. 5 is an explanatory view of various signals transmitted and received between the image pickup section 11 of the CHU 2 in FIG. 2 and the signal processing section 42 of the CCU 3 in FIG. 4.

As shown in FIG. 5, the signal processing section 42 of the CCU 3 transmits a return video signal, a control signal, an audio signal and a GEN-LOCK signal to the image pickup section 11 of the CHU 2.

These signals are packetized and then transmitted in the CCU communication section 41 and received in the CHU communication section 12 via the relay device 5.

In addition, the CHU communication section 12 outputs the received and packetized signals to the image pickup section 11 of the CHU 2.

In addition, the image pickup section 11 of the CHU 2 transmits a video signal, an audio signal and a control signal to the signal processing section 42 of the CCU 3.

These signals are packetized and then transmitted in the CHU communication section 12 and received in the CCU communication section 41 via the relay device 5.

In addition, the CCU communication section 41 outputs the received and packetized signals to the signal processing section 42 of the CCU 3.

In addition, various signals shown in FIG. 5 may be packetized and transmitted separately or in combination.

FIGS. 6A to 6D are explanatory views of asynchronous communication packets transmitted in the camera system 1 of FIG. 1.

Various signals of FIG. 5 are packetized and transmitted in the form of asynchronous communication packets of FIGS. 6A to 6D.

Figure 6:
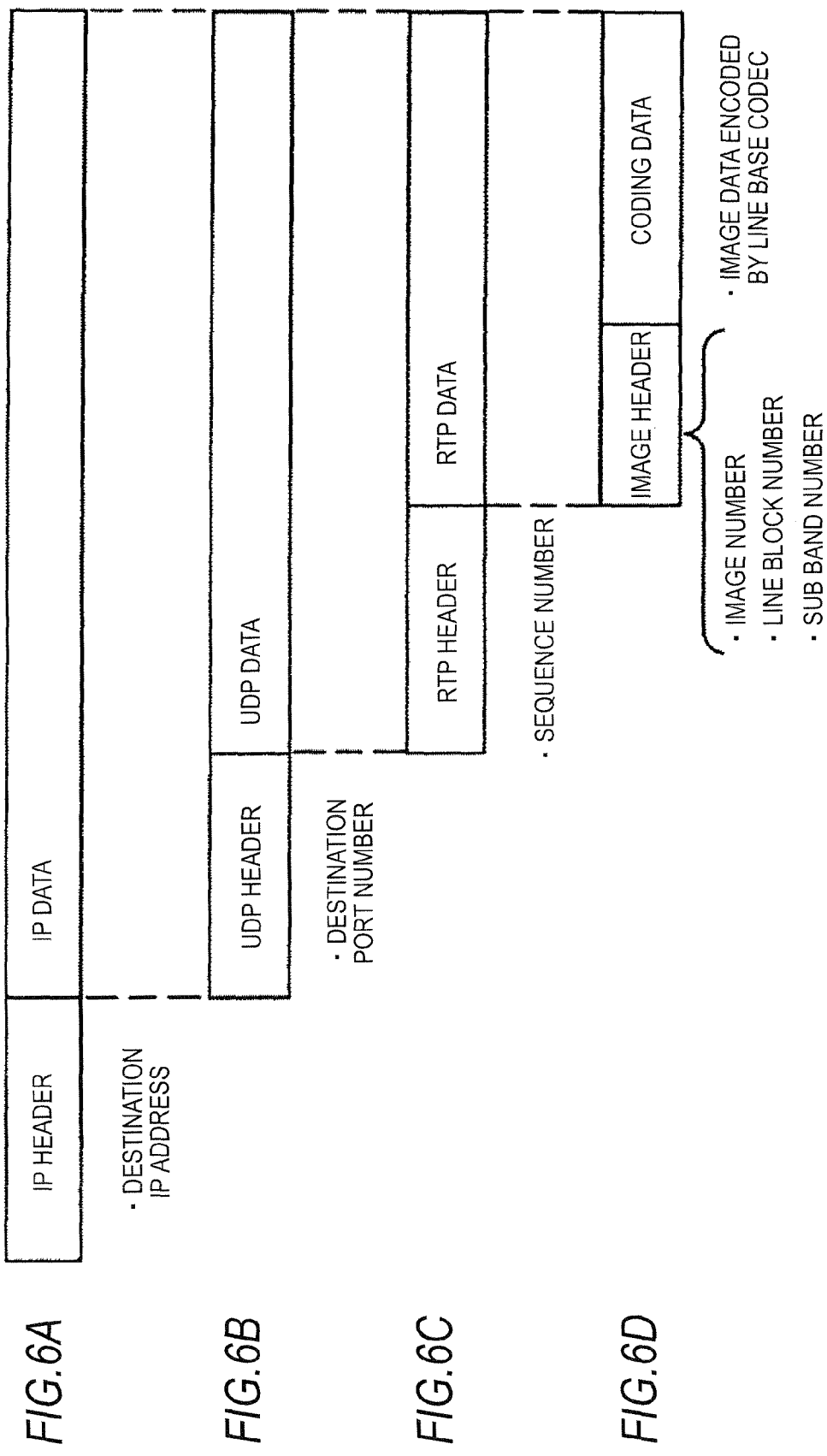
FIGS. 6A to 6D are explanatory views of asynchronous communication packets transmitted in the camera system of 1.

FIG. 6A shows an IP (Internet Protocol) packet transmitted between the CCU communication section 41 and the CHU communication section 12.

The IP packet is composed of an IP header and IP data. The IP header contains control information related to control of a communication path based on an IP protocol, such as, for example, a destination IP address.

FIG. 6B shows a structure of IP data of FIG. 6A.

The IP data includes a UDP (User Datagram Protocol) header including a transmission destination port number, and UDP data. UDP is a protocol of a transport layer of an OSI reference model, which is generally used for transmission of moving image or audio data that is critical for real time performance. The UDP header contains, for example, a destination port number which is application identification information.

FIG. 6C shows a structure of UDP data of FIG. 6B.

The UDP data includes an RTP (Real-time Transport Protocol) header including a sequence number, and RTP data. The RTP header contains control information to guarantee real time performance of a data stream, such as, for example, a sequence number.

FIG. 6D shows a structure of RTP data of FIG. 6C.

The RTP data includes a image header and encoding data. The encoding data are, for example, encoded image data. The image data are compressed and encoded by, for example, line base encoding.

In addition, the image header may contain, for example, a image number, a line block number (a line number when encoding is performed in the unit of a line), a sub band number and so on.

In addition, the image header may be further divided into a image header provided for each image and a line block header provided for each line block.

In this manner, by adding the RTP header, the UDP header and the IP header for the RTP data, the RTP data are transmitted to an intended counterpart device by means of asynchronous packet communication. In addition, a TCP (Transmission Control Protocol) header may be added instead of the UDP header.

[Relay Device 5]

Figure 7:
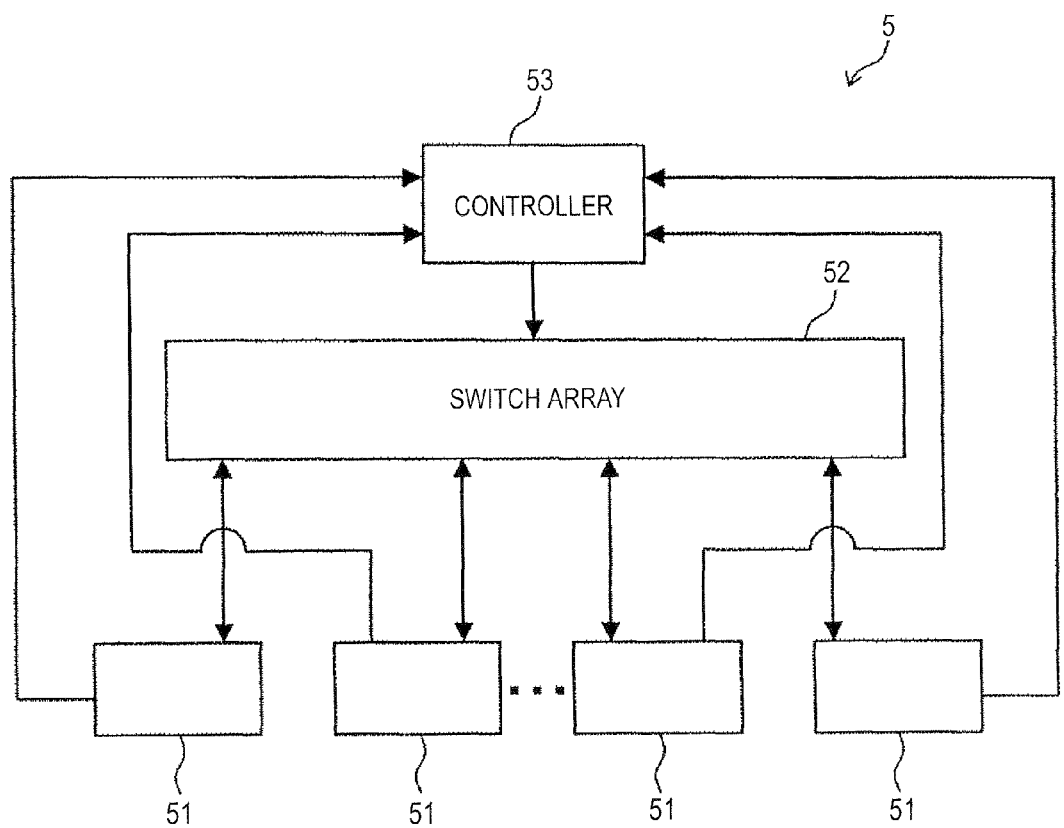
FIG. 7 is a schematic block diagram of a relay device in FIG. 1.

FIG. 7 is a schematic block diagram of the relay device 5 which relays asynchronous communication packets of FIGS. 6A to 6D.

The relay device 5 of FIG. 7 includes a plurality of ports 51, a switch array 52 and a communication controller 53.

Five ports 51 are connected with one end of the twisted-pair cable 4 complying with IEEE 802.3 or the like.

The other end of the twisted-pair cable 4 is connected with, for example, the CHU 2, the CCU 3, an MSU, the RCP 7, the wireless device 8, the monitor 6, the measuring instrument and so on.

Upon receiving the asynchronous communication packets of FIGS. 6A to 6D from any of ports 51, the communication controller 53 determines a transmission destination based on IP headers of the packets or the like.

Based on an instruction from the communication controller 53, the switch array 52 connects a port 51 connected with a transmission destination device to a port 51 to which the asynchronous communication packets are input.

Accordingly, the relay device 5 may transmit the asynchronous communication packets input from any of ports 51 from the port 51 connected with the transmission destination device to a transmission destination.

In this manner, since the transmission destination of the asynchronous communication packets of FIGS. 6A to 6D are determined by the IP header and so on in the relay device 5 and an asynchronous communication path is selected based on a result of determination, the asynchronous communication packets are transmitted to an intended transmission destination by means of asynchronous communication.

For example, packets of various signals of FIG. 5 transmitted from the CCU 3 to the CHU 2 are transmitted to the CHU 2 by means of asynchronous communication via the relay device 5.

In addition, packets of various signals of FIG. 5 transmitted from the CHU 2 to the CCU 3 are transmitted to the CCU 3 by means of asynchronous communication via the relay device 5.

In addition, if an IP address for multicast is contained in the IP header, the relay device 5 transmits the asynchronous communication packets from all ports 51.

Accordingly, for example if other CCU 9, MSU, RCP 7, wireless device 8, monitor 6, measuring instrument and so on are connected to any of ports 51 of the relay device 5, the relay device 5 branches and transmits the asynchronous communication packets to such external devices.

In addition, if the asynchronous communication packets are input from other CCU 9 and so on, the relay device 5 transmits a mixture of the asynchronous communication packets input from the external device to the CHU 2 and the CCU 3.

Such control allows the relay device 5 to transmit a packet of video signal and so on transmitted and received between the CHU 2 and the CCU 3, which are connected to the ports 51, to external devices connected to the ports 51. In addition, the relay device 5 may transmit a packet of GEN-LOCK signal and so on input from the external devices connected to the port 51 to the CHU 2 and the CCU 3 which are connected to the ports 51.

[GEN-LOCK Signal]

Figure 8A:
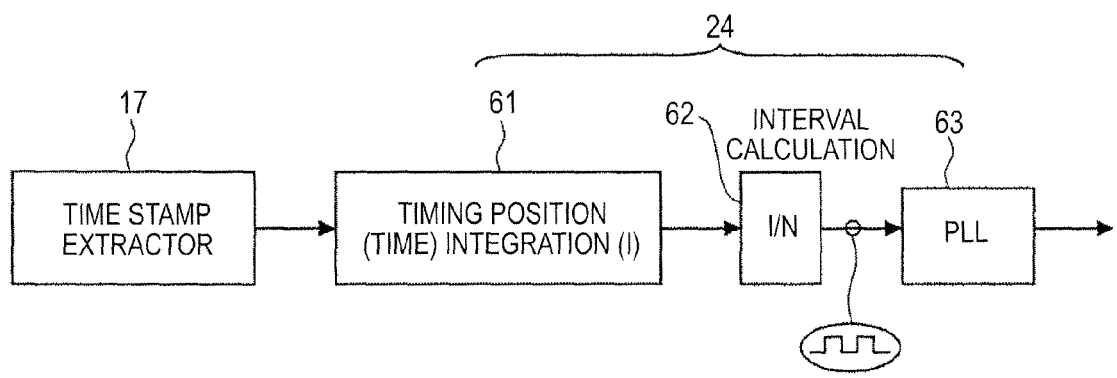
FIGS. 8A and 8B are block diagrams of a time stamp extractor and a clock generator in FIG. 2.
Figure 8B:
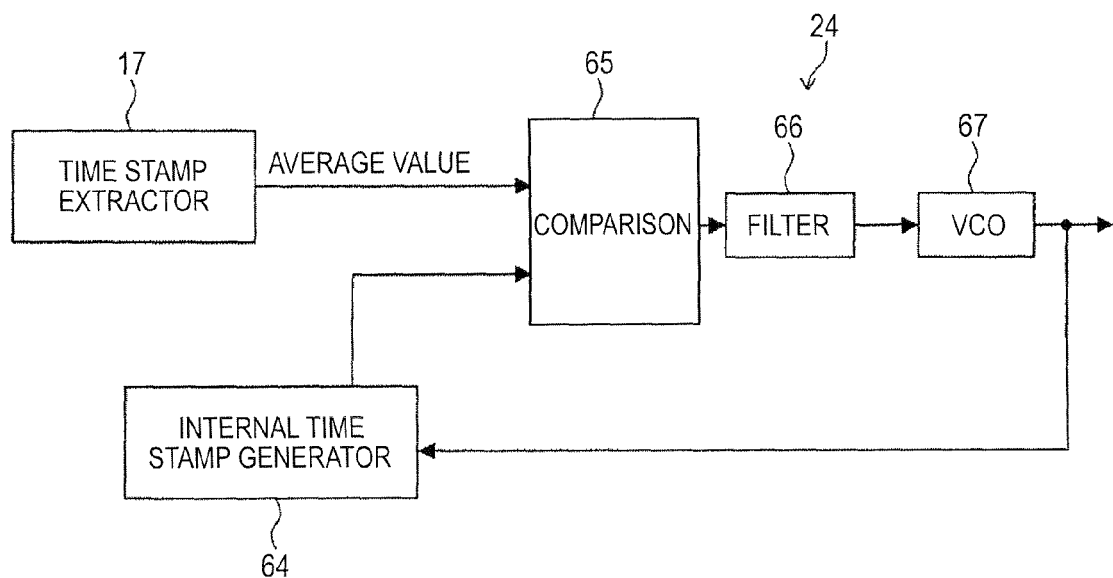

FIGS. 8A and 8B are block diagrams of the time stamp extractor 17 and the clock generator 24 of the CHU 2 of FIG. 2.

The clock generator 24 shown in FIGS. 8A or 8B averages receipt periods of GEN-LOCK signals asynchronously and periodically received by the CHU communication section 12 and generates an internal clock signal.

An integrator 61 in the clock generator 24 shown in FIG. 8A integrates time stamps extracted by the time stamp extractor 17 and a divider 62 in the clock generator 24 divides the result of the integration by the number of integrated time stamps.

Accordingly, an average of image pickup intervals or output intervals of a image is calculated.

A PLL (Phase Locked Loop) circuit 63 generates an internal clock signal synchronizing with a signal waveform of this average.

In addition, the time stamp extractor 17 shown in FIG. 8B calculates an average of a plurality of extracted time stamps.

An Internal time stamp Generator 64 in the clock generator 24 generates an internal time stamp based on a clock signal of VCO (Voltage Controlled Oscillator) 67.

A comparator 65 compares these time stamps and a filter 66 extracts a DC component of a result of comparison and outputs the extracted DC component to VCO 67.

In this manner, the CHU 2 generates the internal clock signal based on the average of the time stamps of packets of the received GEN-LOCK signals.

Accordingly, in the asynchronous communication, although a jitter component may be likely to be contained in a receipt timing of packets of the GEN-LOCK signals received by the CHU 2, the clock generator 24 of the CHU 2 is able to generate an internal clock signal which is little affected by the jitter component.

As a result, an image pickup timing of a image and a transmission timing of a image signal in the image pickup section 11 are stabilized by being little affected by the variation of a clock signal due to asynchronous communication.

Accordingly, in the CHU 2, there is a case where packets of the GEN-LOCK signals transmitted from the CCU 3 or other CCU 9 may be asynchronously received in the CHU 2 via the relay device 5. Even in this case, the CHU 2 is able to pick up video signals and transmit packets at a stable period based on an average receipt period of the GEN-LOCK signals.

As described above, in the first embodiment, the CHU 2 and the CCU 3 of the camera system 1 are connected by the twisted-pair cable 4.

Accordingly, the first embodiment is able to eliminate use of an expensive composite cable for connection between the CHU 2 and the CCU 3, such as an optical fiber cable, a triax cable, a multicable or the like, which may result in inexpensive construction of a live relaying system.

In addition, by virtue of the very low production cost of live broadcasting, any user may create programs simply, thereby providing abundant content.

In the first embodiment, the twisted-pair cable 4 complies with IEEE 802.3 or the like is used as the twisted-pair cable 4.

This enables two-way transmission of image signals, voice signals and control signals using the Internet.

When the relay device 5 is connected to a broadband router, it is possible to confirm or control images and sound at a remote place.

As a result, the number of staff at film locations may be reduced, which may result in a decrease in production costs.

In addition, images at a plurality of film locations may be collected in one place to allow content archives to be processed by staff at one place.

In addition, in the first embodiment, the GEN-LOCK signal may be packetized and output to or input from the outside via the relay device 5.

Accordingly, in the first embodiment, even when a simultaneous relaying operation is performed with a plurality of CHUs 2, the plurality of CHUs may be synchronized with high precision.

As a result, it is not necessary to provide a mass frame memory required when such video signals are not synchronized.

In addition, each video signal may be transmitted with a low delay.

In addition, in the first embodiment, a signal output from the CHU 2 or the CCU 3 may be taken from the relay device 5 connected between the CHU 2 and the CCU 3.

Accordingly, simply by connecting the monitor 6 and so on to the relay device 5, it is possible to monitor an output signal of the CHU 2 and an output signal of the CCU 3.

In addition, since an output signal of the relay device 5 may be transmitted via the Internet or wirelessly, a monitoring is possible during movement without being limited to a monitoring site.

This allows a system to be constructed very flexibly.

In addition, in the first embodiment, since an output signal of the CHU 2 or the CCU 3 may be taken from the relay device 5, it is possible to significantly reduce wirings concentrated on a rear panel of the CCU 3.

In addition, since a GEN-LOCK signal may be simply taken from the relay device 5, it is possible to add the CHU 2 easily. This allows a system to be extended conveniently.

In addition, in the first embodiment, since the CHU 2 is connected to the CCU 3 via the relay device 5, it is possible to simply input a signal from the relay device 5 to the CHU 2 or the CCU 3.

Accordingly, it is possible to add a return video signal from the relay device 5 or simply instruct to an operation of the CHU 2 with voice.

In addition, in the first embodiment, if the camera system 1 is out of order or experiences a problem, since a signal may be received from or transmitted to the relay device 5, it is possible to analyze a fault simply in a short time.

In addition, in the first embodiment, it is possible to construct the camera system 1 flexibly at a very low cost and monitor a signal or add the CHU 2 simply.

Further, in the first embodiment, it is possible to cope with a problem with the camera system 1 simply in a short time.

2. Second Embodiment

FIG. 9 is a schematic view showing a configuration of a camera system 1 according to a second embodiment of the present invention.

In the camera system 1 of FIG. 9, three relay devices 5, i.e., a first relay device 5-1, a second relay device 5-2 and a third relay device 5-3, are connected in series between a CHU 2 and a CCU 3.

These devices are connected by the twisted-pair cable 4 complying with IEEE 802.3 or the like.

A transmittable distance by IEEE 802.3 or the like using the twisted-pair cable 4 is about 100 m.

In contrast, the transmittable distance is several kilometers or so in an optical fiber cable and one to two kilometers or so in a triax cable.

As described above, in the second embodiment, a plurality of relay devices 5 are connected between the CHU 2 and the CCU 3 in series and the length of each twisted-pair cable 4 is limited. As a result, signals may be transmitted over a long transmission distance of 100 m or more.

3. Third Embodiment

FIG. 10 is a schematic view showing a configuration of a camera system 1 according to a third embodiment of the present invention.

The camera system 1 of FIG. 10 includes a plurality of asynchronous transmission devices 71 connected to the relay device 5 connected between a CCU 3 and a CHU 2.

The plurality of asynchronous transmission devices 71 are connected with a headset 72 used for an audio monitor or a monitor 73 used for a video monitor.

In the camera system 1 of FIG. 10, the relay device 5 takes packets of video signal and audio signal being transmitted from the CHU 2 to the CCU 3 and transmits the taken packets to one asynchronous transmission device 71.

The asynchronous transmission device 71 converts the packets input from the relay device 5 to generate normal video and audio signals.

Accordingly, sound of the audio signal being transmitted from the CHU 2 to the CCU 3 is output from the headset 72 connected to the asynchronous transmission device 71.

In addition, the monitor 73 connected to another asynchronous transmission device 71 displays a image of a video signal being transmitted from the CHU 2 to the CCU 3.

In this manner, in the third embodiment, the headset 72 or the monitor 73 may be used for the camera system 1 employing communication of an asynchronous transmission scheme even if they do not correspond to the asynchronous transmission scheme.

Figure 11:
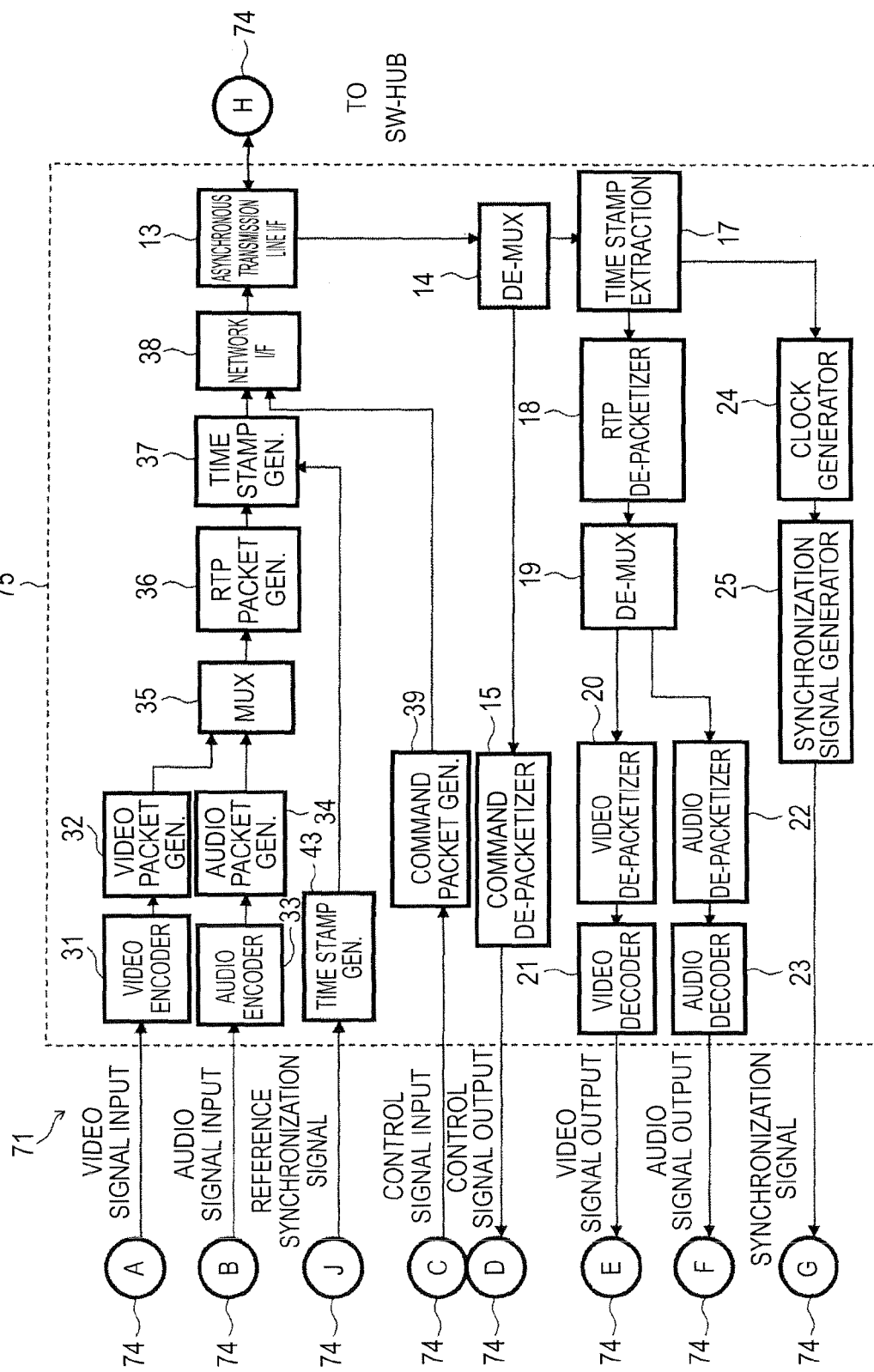
FIG. 11 is a schematic block diagram of an asynchronous transmission line interface device in FIG. 10.

FIG. 11 is a schematic block diagram of the asynchronous transmission device 71 in FIG. 10.

The asynchronous transmission device 71 of FIG. 11 includes a plurality of input/output terminals 74 (A to H) and a signal converter 75.

The input/output terminals 74 are connected to the headset 72, the monitor 73 and so on.

The signal converter 75 has elements having the same functions as the CHU communication section 12 of FIG. 2 and therefore, they are denoted by the same reference numerals and explanation thereof will not be repeated.

The twisted-pair cable 4 complying with IEEE 802.3 is connected to an interface 13 of the signal converter 75.

The signal converter 75 digitalizes and packetizes a video signal, an audio signal, a synchronization signal and a control signal input from the input/output terminals 74 (A to G) and transmits the packetized signal from the input/output terminal 74 (H).

In addition, the signal converter 75 recovers the video signal, the audio signal, the synchronization signal and the control signal from the packets input from the H input/output terminal 74 and outputs the recovered signals to the A to G input/output terminals 74.

For example, a video packet input from the H input/output terminal 74 is converted into a video signal through the demultiplexer 14, the time stamp extractor 17, the RTP depacketizer 18, the demultiplexer 19, the video depacketizer 20 and the video decoder 21.

The video signal is output in a format such as, for example, HD-SDI (High Definition Serial Digital Interface), from the E input/output terminal 74 to the video monitor 73 or a measuring instrument.

Similarly, an audio packet is converted into an audio signal which is output in, for example, an AES-EBU (Audio Engineering Society-European Broadcasting Union) format from the F input/output terminal 74. The audio signal is output to the headset 72 and so on.

In addition, signals output from the E and F input/output terminals 74 may be D/A converted analog signals.

In addition, a time stamp output from the time stamp extractor 17 is input to the clock generator 24.

The clock generator 24 generates a clock signal.

The synchronization signal generator 25 generates a synchronization signal and outputs it from the G input/out terminal 74.

When the G input/output terminal 74 is connected with, for example, another CHU, a plurality of CHUs may be operated in synchronization with a common synchronization signal.

4. Fourth Embodiment

Figure 12:
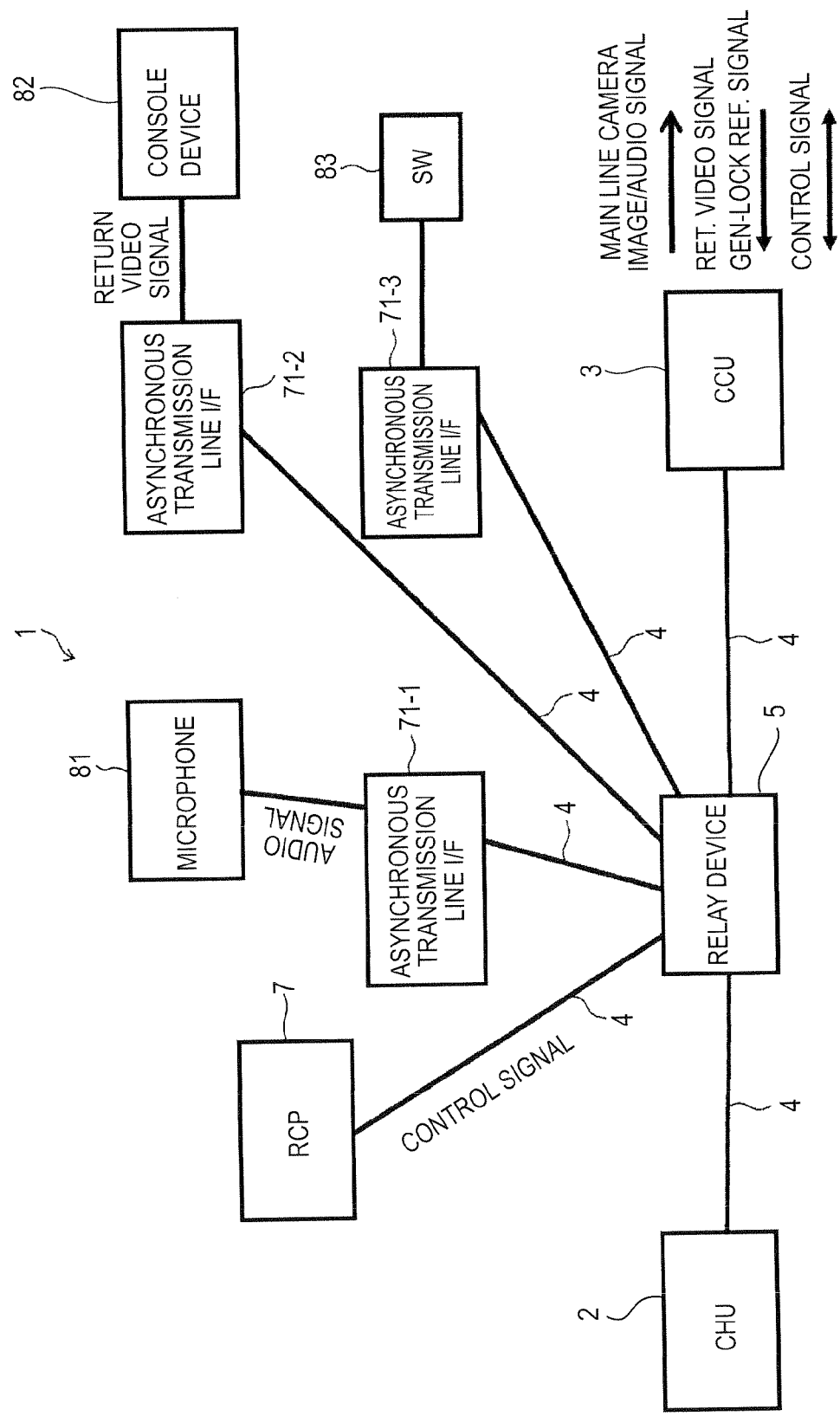
FIG. 12 is a schematic view showing a configuration of a camera system according to a fourth embodiment of the present invention.

FIG. 12 is a schematic view showing a configuration of a camera system 1 according to a fourth embodiment of the present invention.

The camera system 1 of FIG. 12 includes a plurality of asynchronous transmission devices 71-1 to 71-3 connected to the relay device 5 connected between a CCU 3 and a CHU 2.

The plurality of asynchronous transmission devices 71 are connected with a microphone 81 used for audio input, a console device 82 which outputs a return video signal, and a switch 83 which outputs a synchronization signal to a plurality of CHUs.

In the camera system 1 of FIG. 12, the relay device 5 transmits packets input from the outside to the CHU 2 and the CCU 3.

For example, the relay device 5 transmits a packet of voice input from the microphone 81 via the asynchronous transmission device 71-1 to the CHU 2 and the CCU 3.

In addition, the relay device 5 transmits a packet of return video signal output from the console device 82 via the asynchronous transmission device 71-2 to the CHU 2 and the CCU 3.

In addition, the relay device 5 transmits a packet of synchronization signal output from the switch 83 via the asynchronous transmission device 71-3 to the CHU 2 and the CCU 3.

The CHU 2 reproduces sound and a return image externally input from the relay device 5.

In addition, the CHU 2 generates and outputs a video signal in synchronization with an average period of a synchronization signal externally input from the relay device 5.

With the above configuration, in the fourth embodiment, a return video signal, a reference signal for GEN-LOCK and an intercam signal for a meeting with staff may be input from the relay device 5.

In addition, an RCP 7 of FIG. 12 transmits a packet of control signal directly to the relay device 5.

Further, the RCP 7 may be connected to the asynchronous transmission devices 71 and may transmit the packet of control signal to the relay device 5 via the asynchronous transmission devices 71.

5. First Comparative Example

Comparative Example of Camera System Using Optical Fiber Cable

In the above-described first to fourth embodiments, the CHU 2 and the CCU 3 are connected with the twisted-pair cable 4 via the relay device 5.

Figure 13:
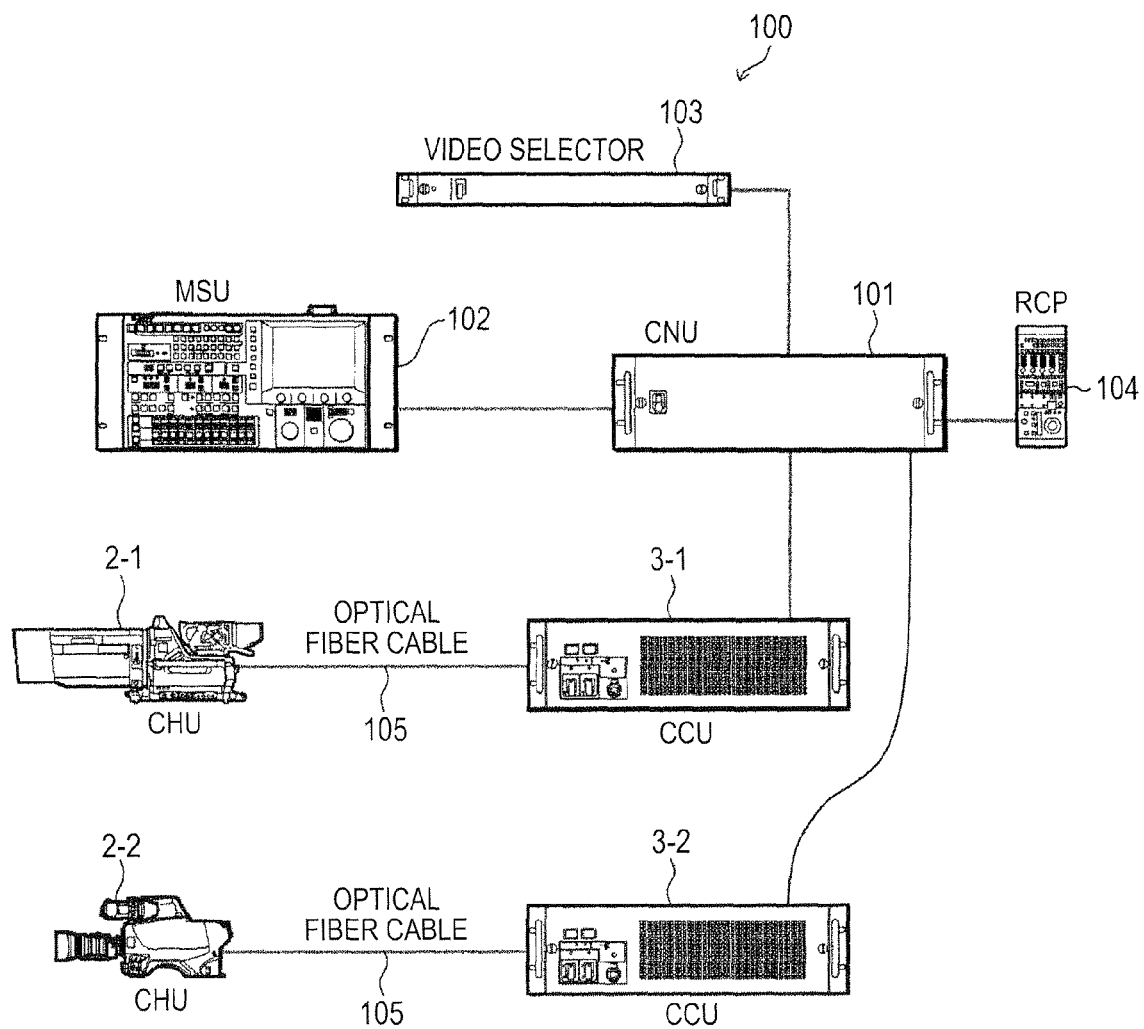
FIG. 13 is a view showing a configuration of a camera system according to a first comparative example.

FIG. 13 is a view showing a configuration of a camera system 100 according to a first comparative example.

The camera system 100 of FIG. 13 includes a plurality of CHUs 2-1 and 2-2, a plurality of CCUs 3-1 and 3-2, a camera command network unit (CNU) 101, an MSU 102, a video selector 103 and an RCP 104.

In addition, CHUs 2-1 and 2-2 are respectively connected to CCUs 3-1 and 3-2 via an optical fiber cable 105.

Figure 14:
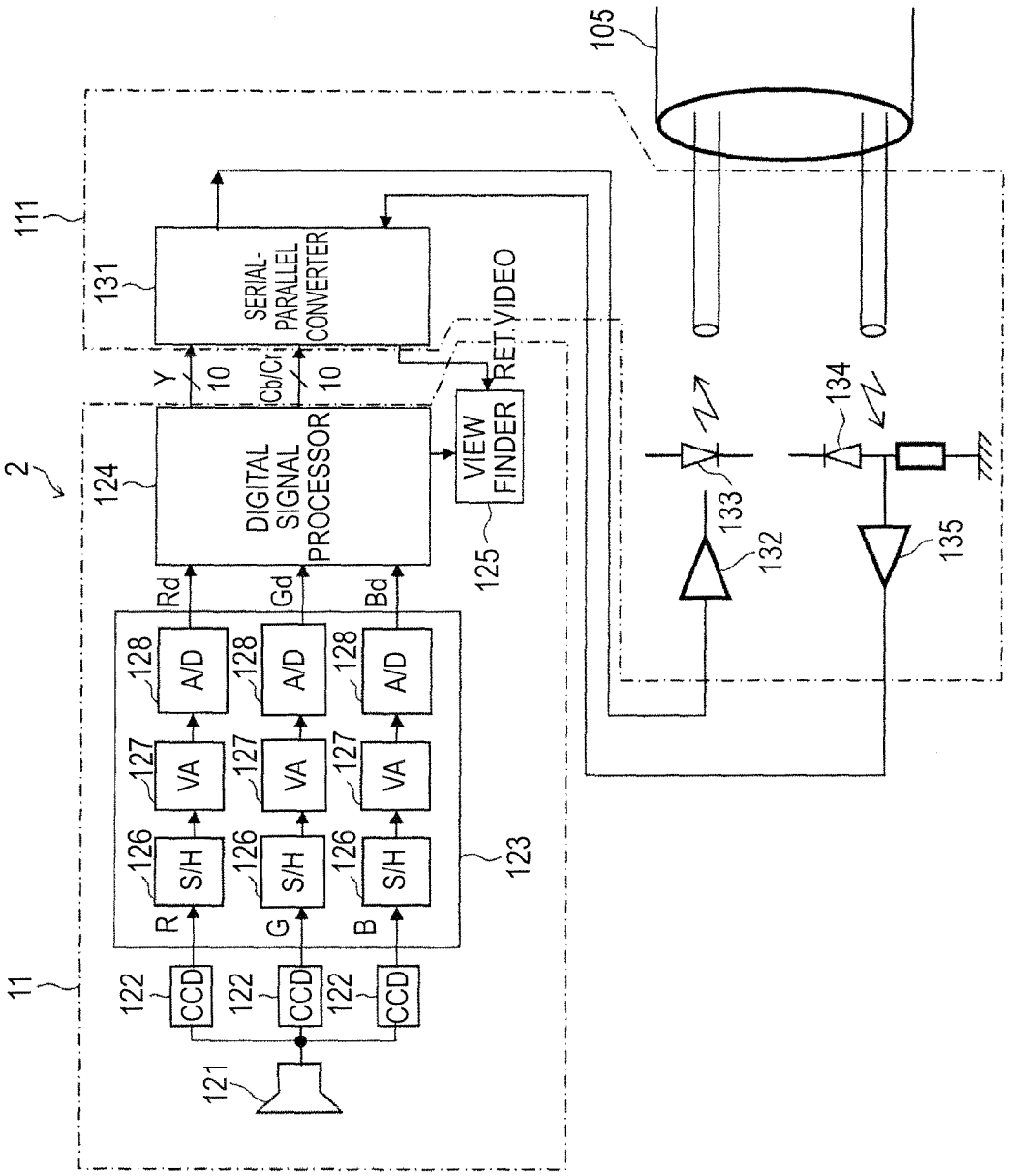
FIG. 14 is a schematic block diagram of the CHU in FIG. 13.

FIG. 14 is a schematic block diagram of the CHU 2 in FIG. 13.

The CHU 2 of FIG. 14 includes an image pickup section 11 and a CHU communication section 111 to which an optical fiber cable is connected.

The image pickup section 11 includes an optical system 121, RGB CCDs (charge coupled devices) 122, an analog signal processor 123, a digital signal processor 124 and a view finder 125.

The CHU communication section 111 includes a serial-parallel converter 131, a laser driver 132, a laser diode 133, a photodiode 134 and a receipt head amplifier 135.

The optical system 121 divides incident light of an image into RGB components.

The RGB CCDs 122 convert the divided RGB component light into electrical signals by means of respective photoelectric conversion elements.

The analog signal processor 123 converts analog signals of CCDs 122 into color component signals containing a plurality of pixel digital values in serial by means of sample hold circuits 126, horizontal scanners 127 and A/D converters 128.

The digital signal processor 124 generates a parallel video signal including, for example, a Y signal, a Cr signal and a Cb signal, from the RGB color component signals.

The serial-parallel converter 131 converts the parallel video signal generated by the digital signal processor 124 into a serial video signal.

The laser driver 132 drives the laser diode 133 with the serial video signal.

The laser diode 133 emits light based on the serial video signal and outputs the light for transmission to the optical fiber cable 105.

The photodiode 134 receives light from the optical fiber cable 105.

The receipt head amplifier 135 amplifies a received signal of the photodiode 134.

The serial-parallel converter 131 converts the received signal into a parallel signal.

The view finder 125 displays an image of a return video signal contained in the received signal or an image pickup signal from the digital signal processor 124.

Figure 15:
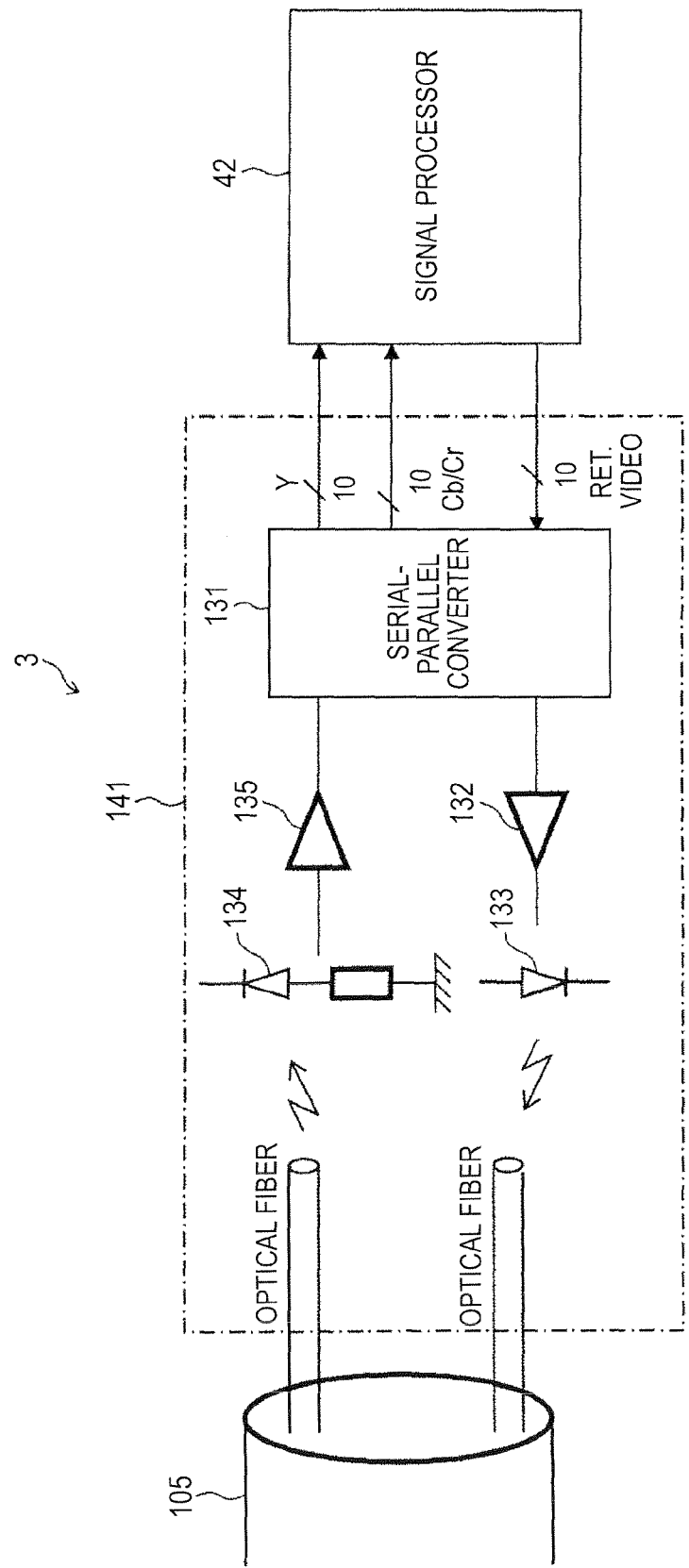
FIG. 15 is a schematic block diagram of the CCU in FIG. 13.

FIG. 15 is a schematic block diagram of CCUs 3-1 and 3-2 in FIG. 13.

Each CCU 3-1 and 3-2 of FIG. 15 includes a signal processor 42 and a CCU communication section 141.

The CCU communication section 141 includes a laser driver 132, a laser diode 133, a photodiode 134, a receipt head amplifier 135 and a serial-parallel converter 131.

The photodiode 134 receives light from the optical fiber cable 105.

The receipt head amplifier 135 amplifies a received signal of the photodiode 134.

The serial-parallel converter 131 converts the received signal into a parallel signal which is then output to the signal processor 42.

The serial-parallel converter 131 converts an input signal from the signal processor 42 into a serial video signal.

The laser driver 132 drives the laser diode 133 with the serial video signal.

The laser diode 133 emits light based on the serial video signal and outputs the light for transmission to the optical fiber cable 105.

In this manner, in the camera system 100 of the first comparative example, CCUs 3 and CHUs 2 may transmit and receive a video signal, a synchronization signal and so on via the optical fiber cable 105.

In addition, when CCUs 3 and CHUs 2 are connected in a one-to-one correspondence by the optical fiber cable 105, an optical signal branching circuit or an optical signal mixing circuit is necessary to take out or insert an optical signal.

Figure 16:
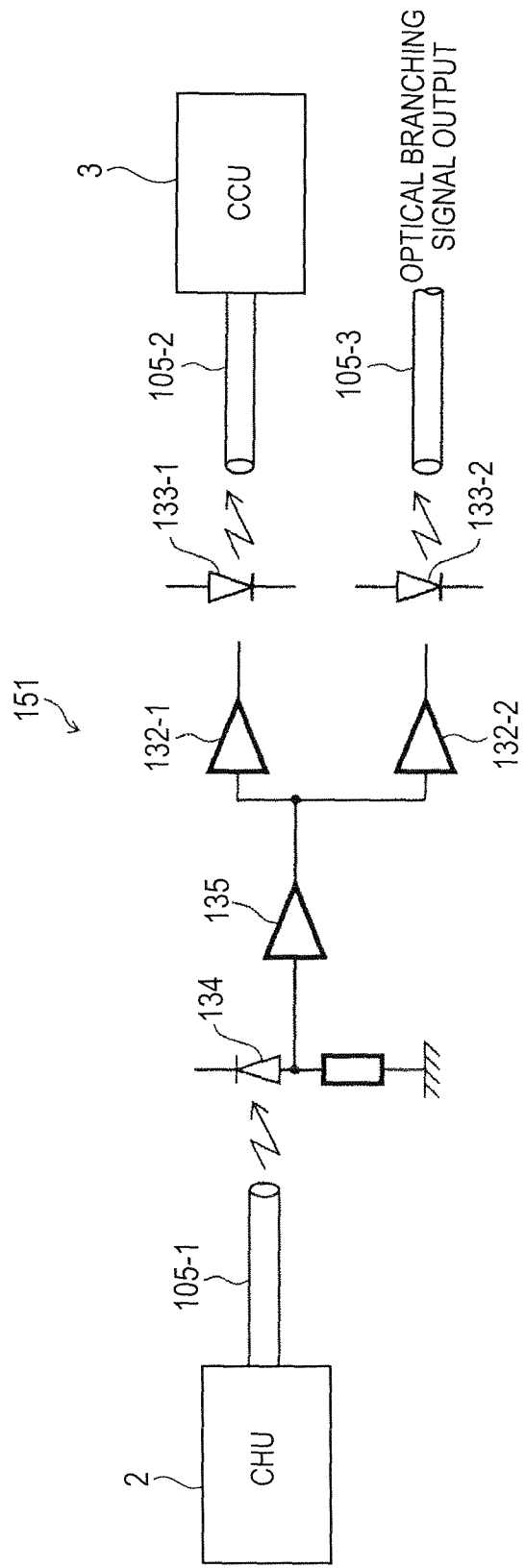
FIG. 16 is a schematic block diagram of an optical branching circuit.

FIG. 16 is a schematic block diagram of an optical branching circuit 151.

The optical branching circuit 151 of FIG. 16 includes a photodiode 134, a receipt head amplifier 135, a first laser driver 132-1, a first laser diode 133-1, a second laser driver 132-2 and a second laser diode 133-2.

The photodiode 134 receives light from a first optical fiber cable 105-1 shown in the left side of the figure.

The receipt head amplifier 135 amplifies the received light signal.

The first laser driver 132-1 drives the first laser diode 133-1 to emit light based on the received light signal.

Accordingly, an optical signal is output to a second optical fiber cable 105-2 shown in the right side of the first laser diode 133-1.

In addition, the second laser driver 132-2 drives the second laser diode 133-2 to emit light based on the received light signal.

Accordingly, an optical signal is output to a third optical fiber cable 105-3 shown in the right side of the second laser diode 133-2.

With the above configuration, the optical branching circuit 151 branches the optical signal input from the first optical fiber cable 105-1 to the second optical fiber cable 105-2 and the third optical fiber cable 105-3.

Figure 17:
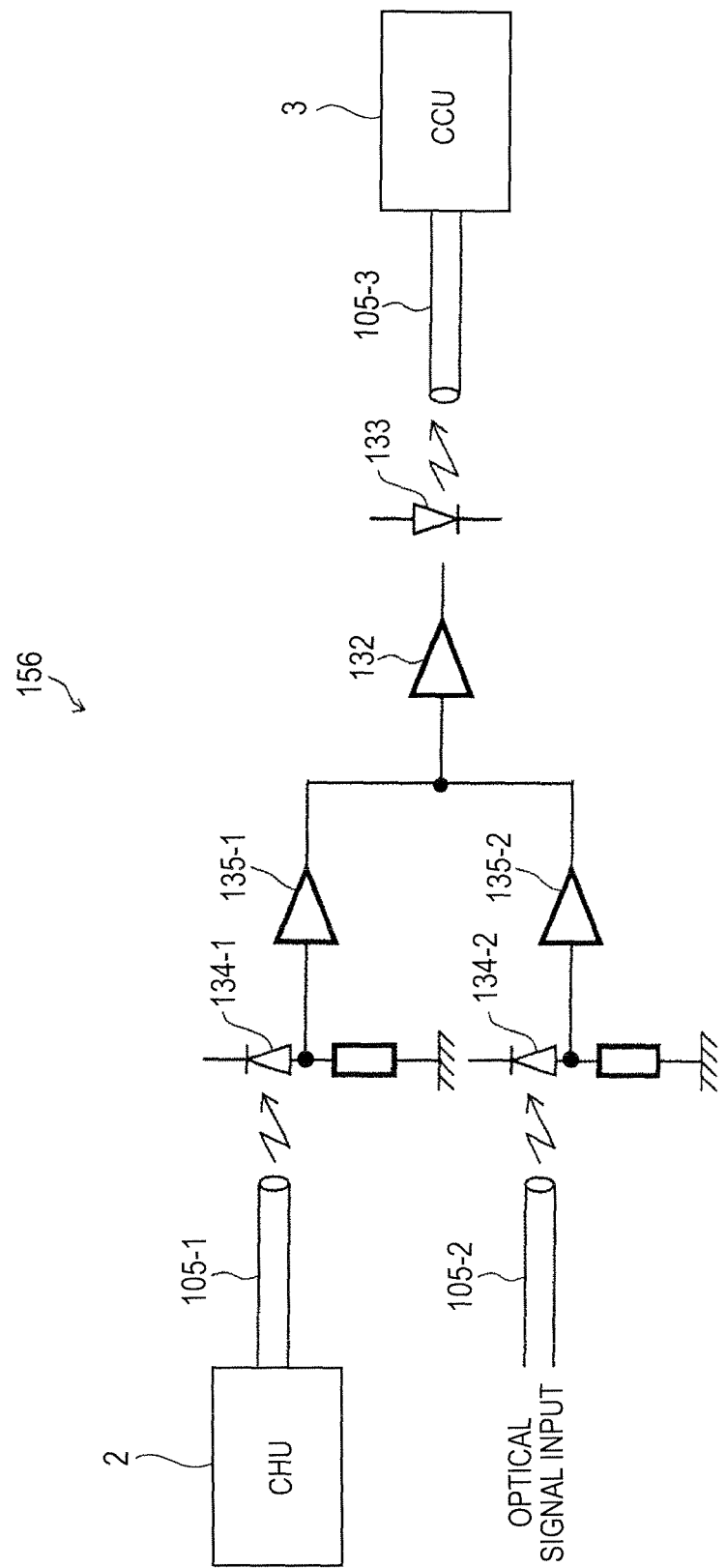
FIG. 17 is a schematic block diagram of an optical mixing circuit.

FIG. 17 is a schematic block diagram of an optical mixing circuit 156.

The optical mixing circuit 156 of FIG. 17 includes a first photodiode 134-1, a first receipt head amplifier 135-1, a second photodiode 134-2, a second receipt head amplifier 135-2, a laser driver 132 and a laser diode 133.

The first photodiode 134-1 receives light from a first optical fiber cable 105-1 shown in the left side of the figure.

The first receipt head amplifier 135-1 amplifies the received light signal of the first photodiode 134-1.

The second photodiode 134-2 receives light from a second optical fiber cable 105-2 shown in the left side of the figure.

The second receipt head amplifier 135-2 amplifies the received light signal of the second photodiode 134-2.

The laser driver 132 is input with the amplified received light signal of the first photodiode 134-1 and the amplified received light signal of the second photodiode 134-2.

The laser driver 132 drives the laser diode 133 to emit light based on the received light signal.

Accordingly, an optical signal is output to a third optical fiber cable 105-3 shown in the right side of the laser diode 133.

With the above configuration, the optical mixing circuit 156 mixes the optical signal input from the first optical fiber cable 105-1 with the optical signal input from the second optical fiber cable 105-2 and outputs the mixed optical signal to the third optical fiber cable 105-3.

If the CCU 3 and the CHU 2 are connected by the optical fiber cable 105, the optical fiber cable 105 has to be processed to take out or insert a signal in the course of signal transmission of the CHU 2 and the CCU 3. Specifically, the optical fiber cable 105 demands the optical branching circuit 151 or the optical mixing circuit 156 to be installed. This makes it difficult for a camera crew or the like to perform such an installation operation in the field.

For example, when CHUs 2 and CCU 3 are connected in a one-to-one correspondence via the optical fiber cable, a case can be considered in which a video signal of an output of the CHU 2, which is being transmitted from the CHU 2 to the CCU 3, is taken from the middle between the CHU 2 and the CCU 3.

This case is very troublesome since an optical signal has to be converted into an electrical signal using an OE converter (a device which converts an optical signal into an electrical signal) and is once branched and then the electrical signal has to be converted again into an optical signal using an EO converter (a device which converts an electrical signal into an optical signal).

If an optical signal is to be directly branched, a transmission distance becomes short as a level of the optical signal is decreased to half or less. In addition an optical branching filter is generally very expensive.

In addition, this is equally applied to a case where an audio signal, a command signal and a metadata signal being transmitted from the CHU 2 to the CCU 3 are taken from the middle between the CHU 2 and the CCU 3.

Likewise, it is difficult to take out a return video signal, an audio signal, a command signal and so on being transmitted from the CCU 3 to the CHU 2 in the middle between the CCU 3 and the CHU 2.

Accordingly, the general camera system 100 using the optical fiber cable 105 cannot take a signal from the middle between the CHU 2 and the CCU 3.

In the general camera system 100 using the optical fiber cable 105, a remote controller (RCP) 7 which outputs a command signal to control CHU 2 and a controller called a "master setup unit (MSU)" 102 are connected to the CCU 3.

In this manner, peripherals connected to the camera system 100 are necessarily connected to the CCU 3 and, as a result, connection cables of the peripherals are concentrated on a rear panel portion of the CCU 3.

In particular, when a plurality of CHUs 2 are used for live relay or the like, since the number of cables connected to CCUs 3 is increased, connection without trouble is a challenge.

In addition, it is not simple to add the CHU 2 after the camera system 100 is established.

In addition, it is inconvenient to view a video signal with the view finder 125 of the CHU 2 or view a signal taken from a rear panel of the CHU 2.

In addition, for example if CHUs 2 and CCU 3 are connected in a one-to-one correspondence via the optical fiber cable 105, a case can be considered in which a video signal is taken from the middle between CHUs 2 and CCUs 3.

This case is very troublesome since an optical signal has to be once converted into an electrical signal using an OE converter (a device which converts an optical signal into an electrical signal), a signal to be input in a region of the electrical signal has to be mixed with a signal being transmitted, and then a mixture of signals has to be converted again into an optical signal using an EO converter (a device which converts an electrical signal into an optical signal).

In addition, although a method of converting signals to be input into optical signals and then mixing the optical signals using a wavelength multiplexing technique in a range of the optical signals may be considered, however, in this case, the laser diode 133 having a controlled wavelength has to be used. In addition, an expensive optical multiplexer and demultiplexer has to be used. In addition, a transmission distance becomes short since an optical insertion loss occurs in the optical multiplexer and demultiplexer.

Accordingly, the general camera system 100 cannot input signals transmitted to the CHU 2, such as, for example, a return video signal, a GEN-LOCK signal and so on, in the middle between the CHU 2 and the CCU 3.

In the general camera system 100 using the optical fiber cable 105, all signals transmitted to the CHU 2 are input from the CCU 3 via the CCU 3.

If a return video signal transmitted to the CHU 2 can be simply added, then this is very convenient for operation.

Likewise, there is no camera system 100 which attempts to input a signal transmitted to the CCU 3 in the middle between CCU 3 and CHU 3 and but the camera system 100 can only transmit a signal input from the CHU 2 to the CCU 3.

6. Second Comparative Example

Example of Camera System Using a Triax Cable

Figure 18:
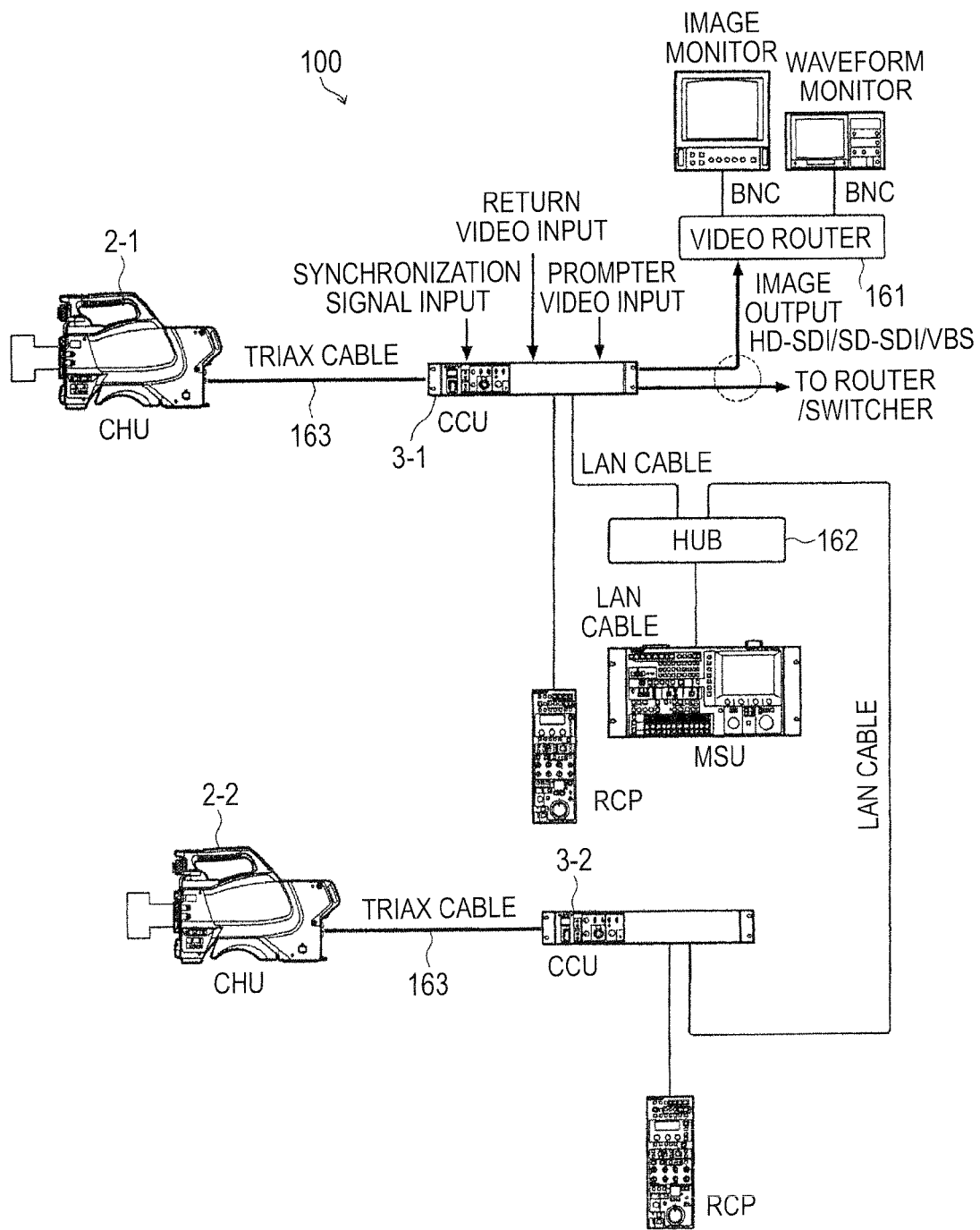
FIG. 18 is a view showing a configuration of a camera system according to a second comparative example.

FIG. 18 is a view showing a configuration of a camera system 100 according to a second comparative example.

The camera system 100 of FIG. 18 includes a plurality of CHUs 2-1 and 2-2, a plurality of CCUs 3-1 and 3-2, a video router 161, a hub 162, an MSU 102 and an RCP 104.

CHUs 2 and CCUs 3 are connected in a one-to-one correspondence by a triax cable 163.

Figure 19:
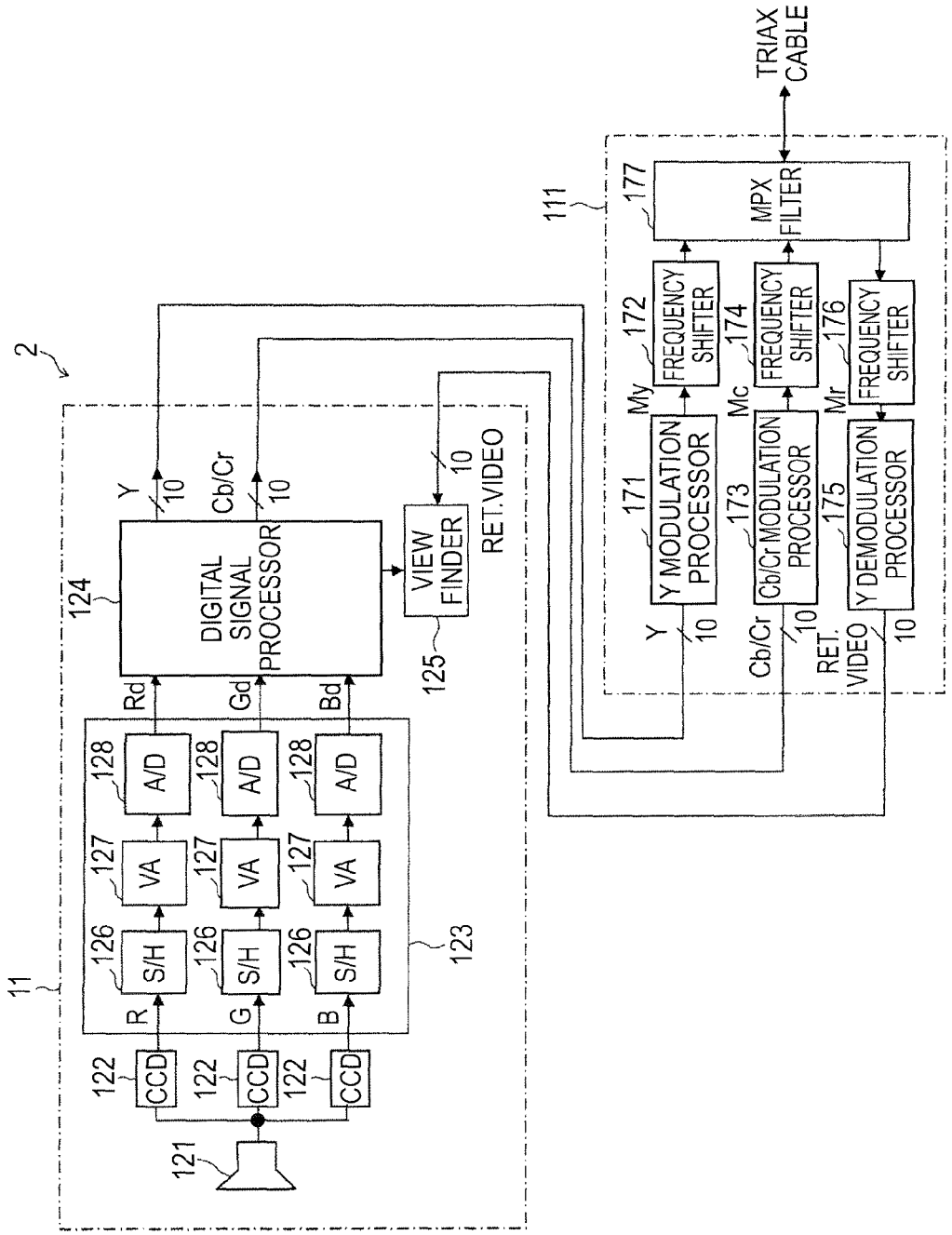
FIG. 19 is a schematic block diagram of the CHU in FIG. 18.

FIG. 19 is a schematic block diagram of the CHU 2 in FIG. 18.

The CHU 2 of FIG. 19 includes an image pickup section 11 and a CHU communication section 111 to which the triax cable 163 is connected.

The image pickup section 11 includes an optical system 121, RGB CCDs 122, an analog signal processor 123, a digital signal processor 124 and a view finder 125.

The CHU communication section 111 includes a Y modulation processor 171, a Y modulation frequency shifter 172, a Cr/Cb modulation processor 173, a Cr/Cb modulation frequency shifter 174, a Y demodulation processor 175, a Y demodulation frequency shifter 176 and an MPX filter 177.

The Y modulation processor 171 modulates a Y signal generated by the image pickup section 11 and the Y modulation frequency shifter 172 shifts a frequency of the modulated Y signal.

The Cr/Cb modulation processor 173 modulates a Cr/Cb signal generated by the image pickup section 11 and the Cr/Cb modulation frequency shifter 174 shifts a frequency of the modulated Cr/Cb signal.

The Y demodulation frequency shifter 176 demodulates the Y signal input from the triax cable 163 and the Y demodulation processor 175 demodulates the Y signal.

The view finder 125 displays a return image of the demodulated Y signal or an image pickup signal from the digital signal processor 124.

Figure 20:
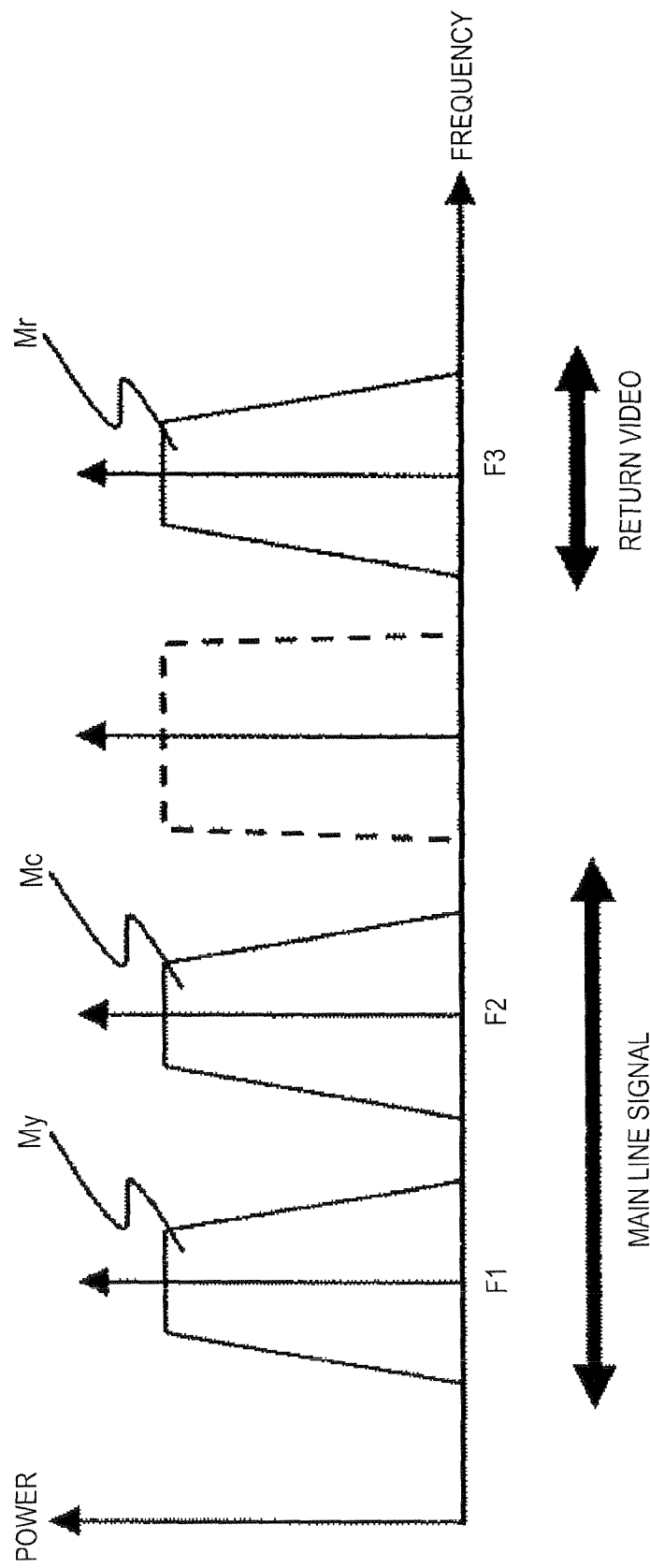
FIG. 20 is an explanatory view of a frequency separation state in the camera system of FIG. 18.

FIG. 20 is an explanatory view of a frequency separation state in the camera system 100 of FIG. 18.

As shown in FIG. 20, the Y signal and the Cr/Cb signal output by the CHU 2 are frequency-shifted to a different frequency band by the frequency shifters.

In addition, the return Y signal is also frequency-shifted to a different frequency band.

Accordingly, the Y signal, the Cr/Cb signal and the return Y signal may be transmitted bidirectionally together by one triax cable 163.

Figure 21:
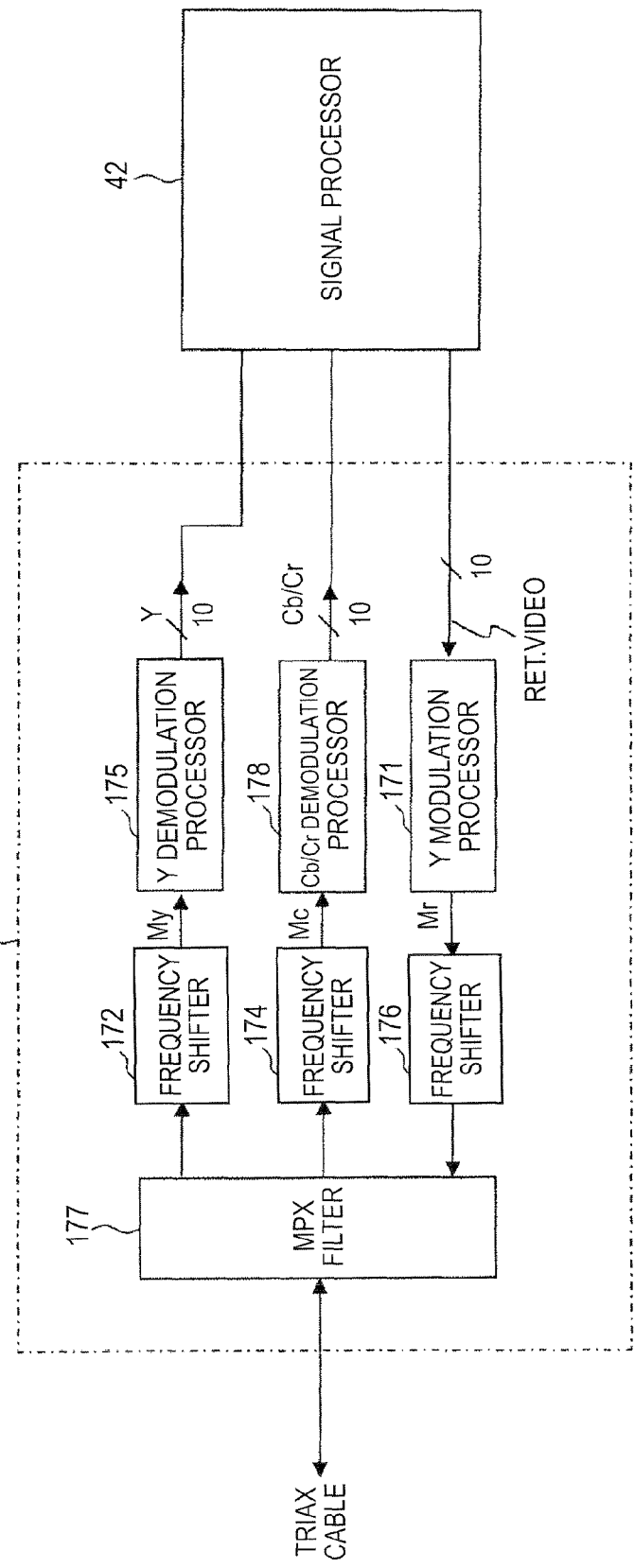
FIG. 21 is a schematic block diagram of the CCU in FIG. 18.

FIG. 21 is a schematic block diagram of the CCU 3 of FIG. 18.

The CCU 3 of FIG. 21 includes a signal processor 42 and a CCU communication section 141.

The CCU communication section 141 includes an MPX filter 177, a Y modulation frequency shifter 172, a Y demodulation processor 175, a Cr/Cb modulation frequency shifter 174, a Cr/Cb demodulation processor 178, a Y modulation frequency shifter 176 and a Y modulation processor 171.

The MPX filter 177 separates a Y signal component and a Cr/Cb signal component from a signal input from the triax cable 163.

The Y demodulation frequency shifter 172 inversely shifts a frequency of the Y signal component and the Y demodulation processor 175 demodulates the Y signal.

The Cr/Cb modulation frequency shifter 174 inversely shifts a frequency of the Cr/Cb signal component and the Cr/Cb demodulation processor 178 demodulates the Cr/Cb signal.

The Y modulation processor 171 modulates a Y signal of a return image and the Y modulation frequency shifter 176 shifts a frequency of the modulated Y signal.

In this manner, in the camera system 100 of the second comparative example, CCUs 3 and CHUs 2 may transmit and receive a video signal, a synchronization signal and so on via the triax cable 163.

In addition, when CCUs 3 and CHUs 2 are connected in a one-to-one correspondence by the triax cable 163, a triax signal branching circuit or a triax signal mixing circuit is necessary to take out or insert a video signal or a synchronization signal.

Figure 22:
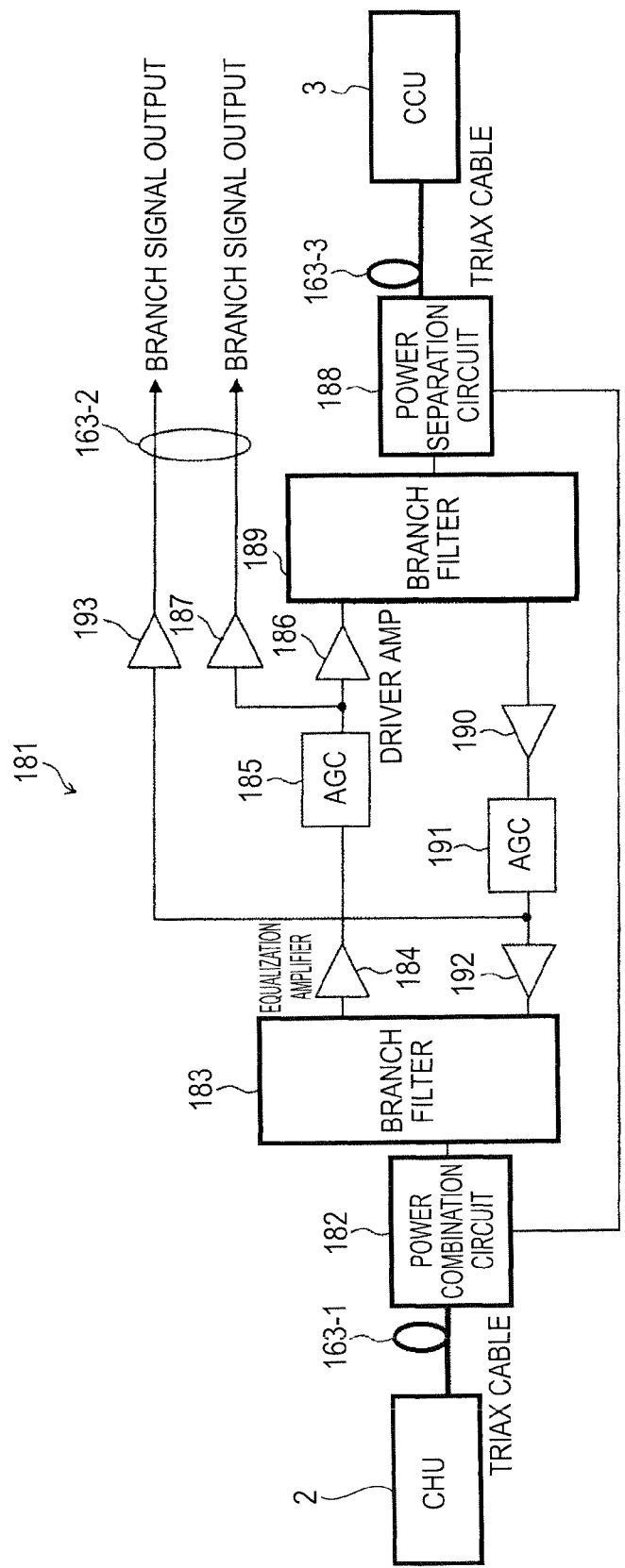
FIG. 22 is a schematic block diagram of a triax signal branching circuit.

FIG. 22 is a schematic block diagram of a triax signal branching circuit 181.

The triax signal branching circuit 181 of FIG. 22 includes a first power combination circuit 182, a first branch filter 183, a first equalization amplifier 184, a first AGC (Auto Gain Controller) 185, a first driver amplifier 186 and a first branch amplifier 187.

In addition, the triax signal branching circuit 181 includes a second power combination circuit 188, a second branch filter 189, a second equalization amplifier 190, a second AGC 191, a second driver amplifier 192 and a second branch amplifier 193.

A signal input from a first triax cable 163-1 shown in the left side of the figure is input to the first driver amplifier 186 and the first branch amplifier 187 via the first power combination circuit 182, the first branch filter 183, the first equalization amplifier 184 and the first AGC 185.

The first branch amplifier 187 outputs a signal to a second triax cable 163-2 shown in the right side of the figure.

The first driver amplifier 186 outputs a signal to a third triax cable 163-3 shown in the right side of the figure.

In addition, a signal input from the third triax cable 163-3 to the second power separation circuit 188 is similarly branched to the first triax cable 163-1 and the second triax cable 163-2 as well.

Figure 23:
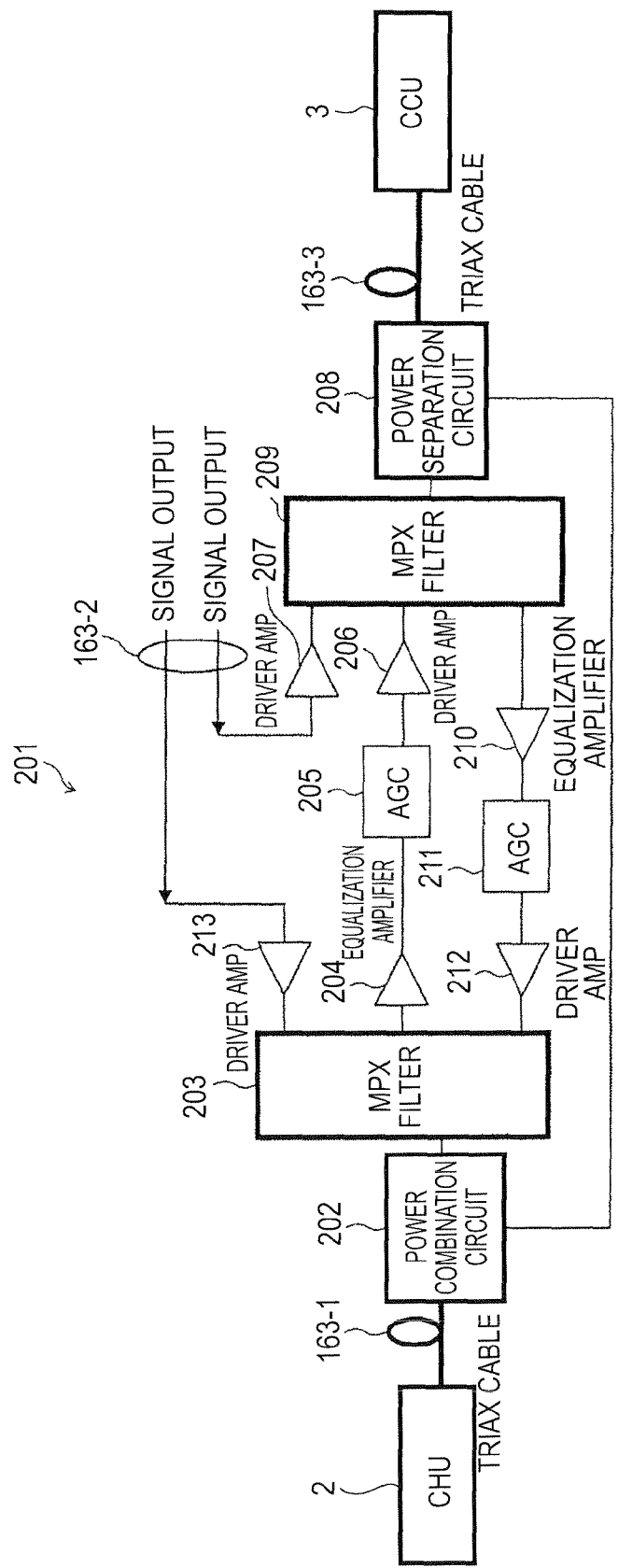
FIG. 23 is a schematic block diagram of a triax signal mixing circuit.

FIG. 23 is a schematic block diagram of a triax signal mixing circuit 201.

The triax signal mixing circuit 201 of FIG. 23 includes a first power combination circuit 202, a first mixing filter 203, a first equalization amplifier 204, a first AGC 205, a first driver amplifier 206 and a first mixing amplifier 207.

In addition, the triax signal mixing circuit 201 includes a second power combination circuit 208, a second mixing filter 209, a second equalization amplifier 210, a second AGC 211, a second driver amplifier 212 and a second mixing amplifier 213.

A signal input from a first triax cable 163-1 shown in the left side of the figure is input to the second mixing filter 209 via the first power combination circuit 202, the first mixing filter 203, the first equalization amplifier 204, the first AGC 205 and the first driver amplifier 206.

A signal input from a second triax cable 163-2 shown in the right side of the figure is also input to the second mixing filter 209 via the first mixing amplifier 207.

The first mixing amplifier 209 mixes these signals and outputs the mixed signals to a third triax cable 163-3 shown in the right side of the figure.

In addition, a signal input from the third triax cable 163-3 to the second power combination circuit 208 is similarly mixed with a signal input to the second triax cable 163-2 and is output to the first triax cable 163-1 in addition.

In order to take out or conversely insert a signal in the middle of the triax cable 163, it is necessary to install the triax signal mixing circuit 201 or the triax signal branching circuit 181. Such installation work is difficult for a camera crew to carry out.

The triax signal mixing circuit 201 or the triax signal branching circuit 181 demands an amplifier to branch an electrical signal into two parts. In addition, such a circuit also demands an AGC circuit to output a signal having the same amplitude as a received electrical signal.

Accordingly, the general camera system 100 including the CCU 3 and the CHU 2 connected with the triax cable 163 is unable to take out or insert a signal in the middle between the CHU 2 and the CCU 3.

The above-described embodiment is merely one example of exemplary embodiments of the present invention in a non-restrictive sense. It should be understood that various modifications may be made without departing from the spirit and scope of the invention.

The present application contains subject matter related to that disclosed in Japanese Priority Patent Applications JP 2010-090673 filed in the Japan Patent Office on Apr. 9, 2010 and JP 2011-053192 filed in the Japanese Patent Office on Mar. 10, 2011, the entire contents of which is hereby incorporated by reference.

What is claimed is:

1. A camera system comprising:
a camera device which generates a picked-up image signal in synchronization with an input synchronization signal and outputs a packetized image signal;
a camera controller which is input with the packetized image signal of the camera device; and
a switching device which is connected between the camera device and the camera controller and is connected to at least one external device, the switching device relays the packetized image signal, which is to be transmitted from the camera device, as is to the camera controller,
wherein the switching device transmits at least an externally input synchronization signal from the external device to the camera device and outputs the packetized image signal as is to (a) the camera device in synchronization with the externally input synchronization signal and (b) an input port of the external device for a packetized data.

2. The camera system according to claim 1,
wherein each of the camera device and the camera controller includes a communication section which transmits the synchronization signal, and
the communication section packetizes and transmits and receives the synchronization signal asynchronously.

3. The camera system according to claim 2,
wherein the camera device includes a synchronization signal generator which averages a receipt period of a plurality of synchronization signals periodically received by the communication section asynchronously to generate an internal synchronization signal, and
the image signal is output in synchronization with the internal synchronization signal.

4. The camera system according to claim 2,
wherein the communication section packetizes the image signal and asynchronously transmits and receives the packetized image signal via the same line as the packetized synchronization signal.

5. The camera system according to claim 1,
wherein the camera device and the camera controller includes respective interfaces which are electrically connected by a twisted-pair cable.

6. The camera system according to claim 1,
wherein switching devices are connected in plural and in series between the camera device and the camera controller.

7. The camera system according to claim 1,
further comprising an external device which communicates with the switching device, wherein the switching device includes
- a first connector which is connected to the camera device by a first cable,
- a second connector which is connected to the camera controller by a second cable, and
- a third connector which communicates with the external device, and the relay device outputs the synchronization signal, which is input from the second connector or the third connector, from the first connector to the camera device via the first cable.

8. The camera system according to claim 7,
wherein the camera device is adapted to receive a return image signal, a control signal and an audio signal in addition to the synchronization signal, and
the switching device receives at least one of the return image signal, the control signal and the audio signal in addition to the synchronization signal from the third connector and outputs the received signal to the camera device.

9. The camera system according to claim 7,
wherein the camera device is adapted to output a control signal and an audio signal in addition to the image signal, and
the switching device outputs at least one of the control signal and the audio signal in addition to the image signal from the third connector to the external device.

10. The camera system according to claim 7,
wherein the camera controller is adapted to receive a control signal and an audio signal in addition to the synchronization signal, and
the switching device receives at least one of the control signal and the audio signal in addition to the synchronization signal from the third connector and outputs the received signal to the camera device.

11. The camera system according to claim 7,
wherein the camera controller is adapted to output at least one of a return image signal, a control signal and an audio signal in addition to the synchronization signal, and
the switching device outputs at least one of the return image signal, the control signal and the audio signal in addition to the synchronization signal from the third connector.

12. The camera system according to claim 7,
further comprising a wireless device connected to the third connector of the switching device,
wherein the external device transmits the synchronization signal to the third connector through wireless communication with the wireless device.

13. A camera device comprising:
an image pickup circuitry which generates a picked-up video signal; and
a communication circuitry which receives the video signal and transmits an image signal including the video signal to a switching device which relays the image signal as is to an external device and to a camera controller,
wherein the communication circuitry receives a packetized synchronization signal from one of the switching device and the camera controller and transmits a packetized image signal in synchronization with receipt of an averaged receipt period of the packetized synchronization signal to the external device and the camera controller.

14. A camera controller comprising:
a communication circuitry which transmits and receives a picked-up image signal and a synchronization signal; and
a signal processor which processes the image signal and the synchronization signal which are transmitted and received by the communication circuitry,
wherein the communication circuitry (a) packetizes and transmits the synchronization signal to a switching device which relays the synchronization signal to a camera device and (b) receives a relayed image signal as is, from the camera device via the switching device, transmitted in synchronization with an averaged receipt period of the packetized synchronization signal.

15. A switching device comprising:
a first hardware connector which is adapted to receive a picked-up image signal from a camera device;
a second hardware connector which is adapted to receive a synchronization signal synchronizing the image signal from a camera controller;
a third hardware connector which bi-directionally communicates with an external device and adapted to receive the synchronizing signal from the external device; and
a communication controller,
wherein the communication controller (a) transmits the synchronization signal, which is input from one of the second hardware connector and the third hardware connector, from the first hardware connector to the camera device, and (b) outputs the image signal as is to the second hardware connector and third hardware connector.

* * * * *